(12) United States Patent
Yagisawa et al.

(10) Patent No.: US 7,454,583 B2
(45) Date of Patent: Nov. 18, 2008

(54) STORAGE CONTROLLER AND CONTROL METHOD FOR DYNAMICALLY ACCOMODATING INCREASES AND DECREASES IN DIFFERENCE DATA

(75) Inventors: Ikuya Yagisawa, Machida (JP); Koji Nagata, Kaisei (JP); Shoji Kodama, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 266 days.

(21) Appl. No.: 11/368,423

(22) Filed: Mar. 7, 2006

(65) Prior Publication Data

US 2007/0162716 A1    Jul. 12, 2007

(30) Foreign Application Priority Data

Jan. 12, 2006    (JP) .............................. 2006-005423

(51) Int. Cl.
*G06F 12/00*    (2006.01)
*G06F 13/00*    (2006.01)
*G06F 13/28*    (2006.01)

(52) U.S. Cl. ..................................... 711/162

(58) Field of Classification Search ........................ None
See application file for complete search history.

(56) References Cited

U.S. PATENT DOCUMENTS

| 6,813,683 | B2 | 11/2004 | Tabuchi et al. | |
|---|---|---|---|---|
| 2004/0243699 | A1* | 12/2004 | Koclanes et al. | 709/224 |
| 2005/0210210 | A1* | 9/2005 | Arai et al. | 711/162 |
| 2005/0240803 | A1* | 10/2005 | Saika et al. | 714/5 |
| 2005/0278704 | A1* | 12/2005 | Ebsen | 717/128 |

FOREIGN PATENT DOCUMENTS

| JP | 2001-209565 | 8/2001 |
|---|---|---|
| JP | 2001-331378 | 11/2001 |
| JP | 2005 267569 | 9/2005 |

* cited by examiner

*Primary Examiner*—Kevin L Ellis
*Assistant Examiner*—Chad L Davidson
(74) *Attorney, Agent, or Firm*—Mattingly, Stanger, Malur & Brundidge, P.C.

(57) ABSTRACT

In a storage controller which stores data provided from a host system, creates a snapshot, which is a data image of a production volume at a given point in time, at regular or irregular intervals, and holds difference data of the snapshot in a pool volume, multiple pool volumes are configured and a different pool volume is assigned to each copy pair including a group of production volumes or a single production volume that does not belong to any group of volumes so that difference data of each copy pair can be saved in its associated pool volume.

17 Claims, 19 Drawing Sheets

- 60 INTERNAL COPY EXECUTION PROGRAM
- 61 REMOTE COPY EXECUTION PROGRAM
- 62 CONTROL PROGRAM
- 63 VOLUME MANAGEMENT TABLE

25

| VOL-ID | PATH INFORMATION | VOL TYPE | POOL VOL FLAG | PAIR INFORMATION |
|---|---|---|---|---|
| 1 | | | | |
| 2 | | | | |
| 3 | | | | |
| 4 | | | | |
| | | | | |

FIG.5

| ACTION | PRIMARY VOL | VIRTUAL VOL | SNAPSHOT MANAGEMENT INFORMATION | SECONDARY VOL | VIRTUAL VOL |
|---|---|---|---|---|---|
| TIME t0 | SPLIT TIME OF PRIMARY AND VIRTUAL VOLS | IMAGE T0 [A] | IMAGE T0 (SIZE=0) | INFORMATION FOR RESTORING IMAGE T0 | — | — |
| TIME t1 | EXECUTE REMOTE COPY | IMAGE T1 [B] | IMAGE T0 [A] | INFORMATION FOR RESTORING IMAGE T0 | — | — |
| TIME t2 | COMPLETION OF REMOTE COPY | IMAGE T2 [C] | IMAGE T0 [A] | INFORMATION FOR RESTORING IMAGE T0 | IMAGE T0 [A] | — |
| TIME t3 | SPLIT TIME OF PRIMARY AND VIRTUAL VOLS | IMAGE T3 [D] | IMAGE T3 (SIZE=0) | INFORMATION FOR RESTORING IMAGE T3 | IMAGE T0 [A] | — |
| TIME t4 | EXECUTE REMOTE COPY | IMAGE T4 [E] | IMAGE T3 [D] | INFORMATION FOR RESTORING IMAGE T3 | IMAGE T0 [A] | — |
| TIME t5 | COMPLETION OF REMOTE COPY | IMAGE T5 [F] | IMAGE T3 [D] | INFORMATION FOR RESTORING IMAGE T3 | IMAGE T3 [B][D] | IMAGE T3 [A] |
| TIME t6 | SPLIT TIME OF PRIMARY AND VIRTUAL VOLS | IMAGE T6 [G] | IMAGE T6 (SIZE=0) | INFORMATION FOR RESTORING IMAGE T6 | IMAGE T3 [B][D] | IMAGE T3 [A] |
| ... | ... | ... | ... | ... | ... |

| SEQUENCE NUMBER | SNAPSHOT CREATION TIME | SVOL FULL-FORMATION TIME |
|---|---|---|
| 1 | 12:05:01 | 12:06:52 |
| 2 | 12:05:03 | 12:06:53 |
| ⋮ | ⋮ | ⋮ |

FIG.21

| TIME SLOT | AMOUNT OF DATA TRANSFERRED |
|---|---|
| 0:00~1:00 | |
| 1:00~2:00 | |
| 2:00~3:00 | |
| ⋮ | ⋮ |
| 23:00~0:00 | |

| TIME SLOT | MAXIMUM NUMBER OF COMMAND JOBS |
|---|---|
| 0:00~1:00 | 100 |
| 1:00~2:00 | 80 |
| 2:00~3:00 | 40 |
| ⋮ | ⋮ |
| 23:00~0:00 | 120 |

131

STORAGE CONTROLLER AND CONTROL METHOD FOR DYNAMICALLY ACCOMODATING INCREASES AND DECREASES IN DIFFERENCE DATA

CROSS-REFERENCES TO RELATED APPLICATIONS

This application relates to and claims priority from Japanese Patent Application No. 2006-005423, filed on Jan. 12, 2006, the entire disclosure of which is incorporated herein by reference.

BACKGROUND OF THE INVENTION

The present invention relates to a storage controller and a control method thereof, and is suitably applicable to a storage controller including snapshot and remote copy capabilities.

Some conventional storage controllers include the snapshot capability which maintains a point-in-time data image of a logical volume (snapshot) (see Japanese Patent Laid-Open No. 2001-209565). A number of methods for creating snapshots on these storage controllers have been proposed such as a first method in which only the differences from an original logical volume are held as a snapshot and a second method in which data is duplexed and held in two logical volumes and, when creating a snapshot, the duplex is suspended and one of the volumes is provided as a snapshot.

For the second snapshot creating method, an approach has been proposed in recent years in which an additional, temporary logical volume for temporarily storing a snapshot is provided and is used as a buffer when data stored in a logical volume that is to be provided as a snapshot is saved into a storage media such as a tape (see Japanese Patent Laid-Open No. 2001-331378). This method has the advantages that the time for which duplex is suspended for obtaining a snapshot can be reduced, and the amount of original data copied to a mirror-target logical volume for mirror resynchronization can be reduced to reduce the time required for mirror resynchronization during which the performance of data access from a database program degrades.

On the other hand, storage systems have been made commercially available that use the so-called remote copy function as a method for guarding data against disasters such as earthquakes, fires, and floods or terror attacks that duplexes and holds data in a primary storage controller and a secondary storage controller located at a main center and a remote center, respectively, ten to several hundreds kilometers split from each other.

The remote copy function is broadly classified into two types: synchronous and asynchronous. The synchronous remote copy function performs remote copy in such a manner that completion of a data write is reported to a host system after the data is written in both primary and secondary storage controllers. The asynchronous remote copy function performs remote copy in such a manner that completion of a data write is reported to a host system after the data is written in a primary storage controller, and then the data is transferred to the secondary storage controller at an appropriate time.

If conventional storage systems using such a remote copy function include multiple storage controllers at both of the primary and secondary locations, each of the storage controllers at the primary location is independently connected to its associated controller at the secondary location through a communication link and remote copy is performed between them. Therefore, if the main center at which the primary storage controllers are located breaks down, temporal inconsistency in remote-copied data may occur among the secondary storage controllers located at the remote center. It is difficult to maintain data consistency between the main and remote centers if some precautionary measures such as timestamping have not been taken.

Therefore, a technology has been proposed in recent years in which a single storage controller at the main center (hereinafter referred to as the primary storage controller) is connected with the remaining storage controllers (hereinafter referred to as secondary storage controllers), the primary storage controller repeatedly in synchronization with this, suspends and resumes remote copying at predetermined times and the second storage controllers repeatedly suspend and resume remote copying, thereby ensuring data consistency between the main and remote centers at suspension times.

Here, consider a storage system that has the first snapshot-creating method described above and the asynchronous remote copy function and includes a primary storage controller in which multiple logical volumes for a user to read and write data are provided (hereinafter referred to as the first logical volumes).

If the amount of data write to a particular first logical volume in the storage system increases and exceeds the amount of data transferred from the primary storage controller to a secondary storage controller, the first logical volume consumes much of the storage space in a logical volume for holding the differences between the original, first logical volume and the created snapshot (hereinafter referred to as the second logical volume) and, at the worst, exhausts the storage space.

Therefore, a storage system in which all of the first logical volumes in a primary storage controller share a single second logical volume has the problem that an increase in the amount of data write to a particular first logical volume impacts the entire storage system and consequently it becomes difficult to create and retain snapshots of the other logical volume.

SUMMARY OF THE INVENTION

The present invention has been made in light of these circumstances and proposes a reliable storage controller and a control method thereof, that solve the problem stated above.

To solve the problem, according to the present invention, there is provided a storage controller which holds write data provided from a host system and duplexes the data in another storage controller, including a storage device which provides a storage area for storing data; and a controller which configures a production volume and a pool volume on the storage area, sequentially stores the data provided from the host system into the production volume, creates a snapshot composed of an data image of the production volume at a given point in time at regular or irregular intervals and, when the data is written in the production volume after the snapshot is created, saves the original data that is contained in the production volume immediately prior to the write of the data into the pool volume as difference data as appropriate and, after creating a new version of the snapshot, reads the difference data of the previously created snapshot from the pool volume and transfers the difference data to the other storage controller; wherein the controller configures a plurality of the pool volumes, assigns a different one of the pool volumes to each of copy pairs, each including a group of plurality of the production volumes or one of the production volumes that does not belongs to any of the production volumes, and saves the difference data of the copy pair into one of the pool volumes that is associated with the copy pair.

Thus, the storage controller can prevents an increase in the amount of data write to a particular production volume from affecting the other copy pairs.

According to the present invention, there is also provided a method for controlling a storage controller which holds write data provided from a host system and duplexes the data in another storage controller, including a first step of configuring a production volume and a pool volume on a storage area provided by a storage device; a second step of sequentially storing the data provided from the host system into the production volume, creating a snapshot composed of an data image of the production volume at a given point in time at regular or irregular intervals and, when the data is written in the production volume after the snapshot is created, saving the original data that is contained in the production volume immediately prior to the write of the data into the pool volume as difference data as appropriate and, after creating a new version of the snapshot, reading the difference data of the previously created snapshot from the pool volume and transferring the difference data to the other storage controller; wherein the first step configures a plurality of the pool volumes, assigns a different one of the pool volumes to each of copy pairs, each including a group of plurality of the production volumes or one of the production volumes that does not belong to any of the production volumes; and the second step saves the difference data of the copy pair into one of the pool volumes that is associated with the copy pair.

Thus, the method for controlling a storage controller can prevent an increase in the amount of data write to a particular production volume from affecting the other copy pairs.

According to the present invention, there is provided a storage controller which holds write data provided from a host system and duplexes the data in another storage controller, including: a storage device which provides a storage area for storing data; and a controller which configures a production volume and a pool volume on the storage area, sequentially stores the data provided from the host system into the production volume, creates a snapshot composed of an data image of the production volume at a given point in time at regular or irregular intervals and, when the data is written in the production volume after the snapshot is created, saves the original data that is contained in the production volume immediately prior to the write of the data into the pool volume as difference data as appropriate and, after creating a new version of the snapshot, reads the difference data of the previously created snapshot from the pool volume and transfers the difference data to the other storage controller; wherein the controller configures a plurality of the pool volumes, assigns a first pool volume out of a plurality of the pool volumes to a first copy pair, and assigns a second pool volume to both of a second and third copy pairs.

Thus, the storage controller can prevent an increase in the amount of data write to a particular production volume from affecting the other copy pairs.

According to the present invention, a highly reliable storage controller and a control method thereof can be provided.

BRIEF DESCRIPTION OF THE DRAWINGS

FIG. 5 is a sequence diagram used for illustrating a method for managing snapshots in the storage system;

FIG. 18 is a conceptual diagram showing a time difference management table;

FIG. 21 is a conceptual diagram showing a calculated data transfer amount table; and FIG. 22 is a conceptual diagram showing a schedule script.

DETAILED DESCRIPTION OF THE PREFERRED EMBODIMENTS

An embodiment of the present invention will be described below with respect to the accompanying drawings.

(1) Configuration of Storage System According to the Present Embodiment

Figure 1:
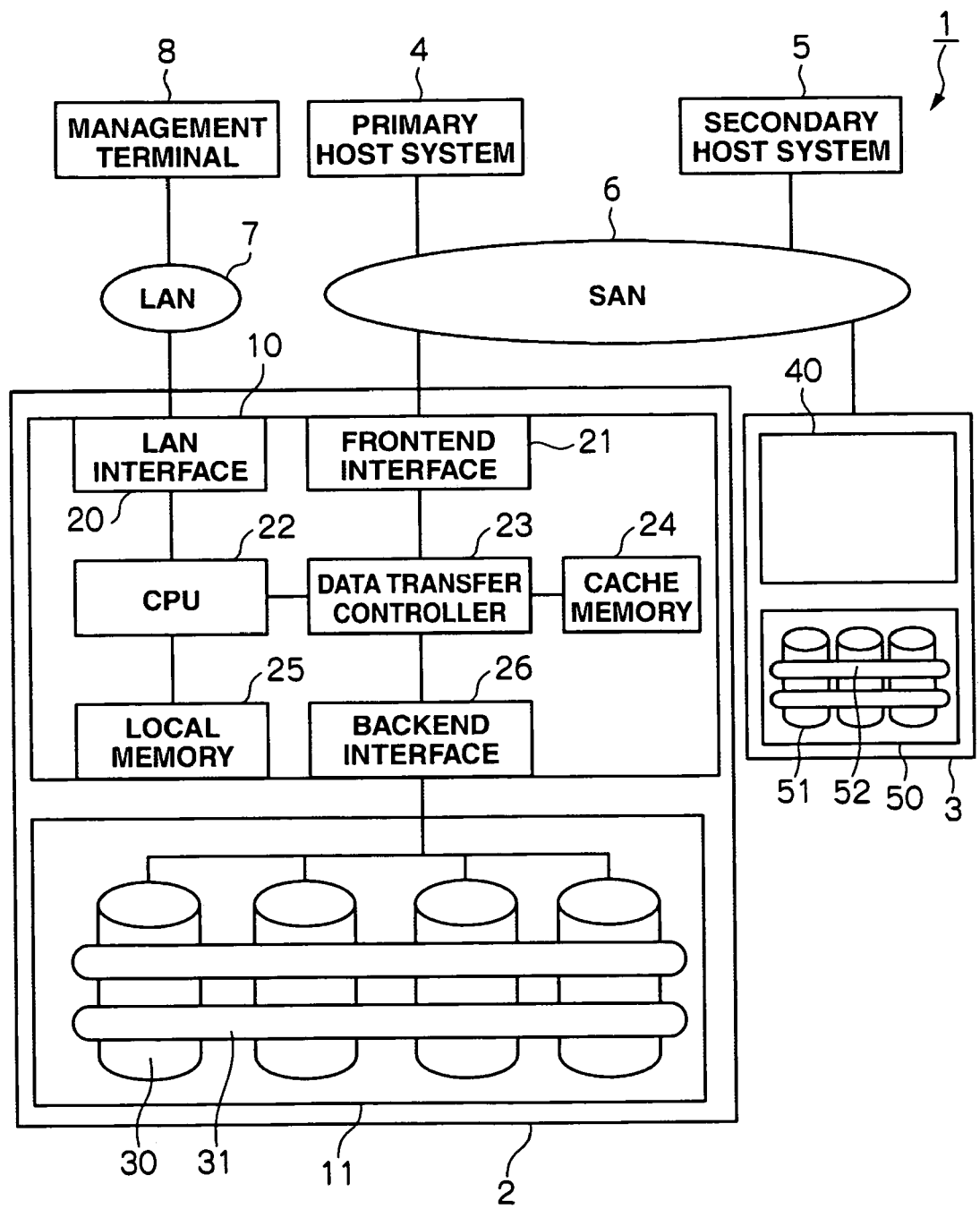
FIG. 1 is a block diagram showing a configuration of a storage system according to an embodiment of the present invention.

FIG. 1 shows a system configuration of a storage system 1 according to the present embodiment. The storage system 1 includes a first storage controller 2 and a second storage controller 3. The first storage controller 2, the second storage controller 3, a primary host system 4, and a secondary host system 5 are interconnected through an SAN (Storage Area Network) 6. The first storage controller 2 and the primary host system 4 may be interconnected thorough a first SAN, the second storage controller 3 and the secondary host system 5 may be interconnected through a second SAN, and the first storage controller 2 and the second storage controller 3 may be interconnected through a lease line such as a Fibre Channel or an IP network.

The primary host system 4 is a production host system, which primarily requests the first storage controller 2 to perform I/O operations as long as the system is successfully working. The secondary host system 5 is a backup host system, which mainly requests the second storage controller 3 to perform I/O operations and, takes over processing that have been performed by the primary host system 4 in the event of a failure in the primary system. The primary host system 4 and the secondary host system 5 may be personal computers, workstations, or mainframe computers, for example.

The storage system 1 is designed so that data written in the first storage controller 2 is remote-copied to the second storage controller 3, thereby allowing the duplex data to be held in the first and second storage controllers 2, 3. The second storage controller 3 holds the same data image that was held by the first storage controller 2. Thus, in case the first storage controller 2 fails, the second storage controller 3 can be used to keep the system operating.

Remote copy may be synchronous copy, in which completion of a write is reported to the primary host system 4 after the data is written in both of the first storage controller 2 and the second storage controller 3, or a asynchronous copy, in which completion of a write is reported to the primary host system 4 after the data is written in the first storage controller 2, and the data is transferred to the secondary storage controller 3 at an appropriate later point in time. In the following description, an example is shown in which the first storage controller 2 is used as the production, primary storage controller and the second storage controller 3 is used as the backup, secondary storage controller.

The first storage controller 2 includes a controller 10 and a storage device 11 as its main components.

The controller 10 includes a LAN (Local Area Network) interface 20, a frontend interface 21, a CPU 22, a data transfer controller 23, a cache memory 24, a local memory 25, and a backend interface 26.

The controller 10 is capable of controlling multiple disk drives 30 located in the storage device 11 at a RAID level (for example level 0, 1, or 5) specified in the RAID scheme. In the RAID scheme, multiple disk drives 30 are managed as a single RAID group. Defined on the RAID group are multiple logical volumes 31, each of which is a unit of access from the primary host system 4. A LUN (Logical Unit Number) is assigned to each logical volume 31.

The CPU 22 is a processor that controls I/O operations (write or read access) to multiple disk drives 30 in response to data input/output requests from the primary host system 4.

The local memory 25 stores micro programs and data such as a volume management table. The micro programs and the volume management table will be detailed later.

The cache memory 24 is a buffer memory which temporarily stores write data to be written into disk drives 30 or read data read out from disk drives 30. The cache memory 24 is a non-volatile memory which is buttery-backed and does not lose cache data if power failure occurs in the first storage controller 2.

The data transfer controller 23 interconnects the cache memory 24, the frontend interface 21, the backend interface 26, and the CPU 22, and controls data transfer between the primary host system 4 and the disk drives 30. When a write access request is issued from the primary host system 4, the data transfer controller 23 writes data received from the primary host system 4 through the frontend interface 21 in the cache memory 24 and then transfers the write data to the backend interface 26 in order to write the write data asynchronously into disk drives 30. When a read access request is issued from the primary host system 4, the data transfer controller 23 writes read data read from disk drives 30 through the backend interface 26 in the cache memory 24 and transfers the read data to the frontend interface 21.

The frontend interface 21 is a controller that controls the interface to the primary host system 4 and has the function of receiving a block access request based on the Fibre Channel protocol, for example, from the primary host system 4.

The backend interface 26 is a controller that controls the interface with the disk drives 30 and has the function of controlling data input/output requests based on a protocol that controls the disk drives 30 to the disk drives 30.

The LAN interface 20 is an interface for connecting to a LAN 7 and controls transmission and reception of data and control signals to and from a management terminal 8 according to TCP/IP.

The storage device 11 includes multiple disk drives 30. The disk drives 30 are storage devices such as FC (Fibre Channel) disk drives, SATA (Serial Advanced Technology Attachment) disk drives, PATA (Parallel Advanced Technology Attachment) disk drives, FATA (Fibre Attached Technology Adapted) disk drives, SAS (Serial Attached SCSI) disk drives, or SCSI (Small Computer System Interface) disk drives.

The first storage controller 2 is connected to the management terminal 8 through a LAN (Local Area Network) 7. The management terminal 8 is a computer system having hardware resources such as a CPU, a memory, and a display. A system administrator performs input operations on the management terminal 8 to send commands for managing the first storage controller 2 to the first storage controller 2. Examples of commands for managing the first storage controller 2 include a command instructing the first storage controller 2 to add or remove a storage device 30 or to make a modification to the RAID configuration, a command for configuring a communication path between the primary system 4 and the first storage controller 2, a command for installing a micro program for the CPU 22 in the memory 25, and a command for checking the operation status of the first storage controller 2 or locating fault in the first storage controller 2.

The second storage controller 3 includes a controller 40 and a storage device 50 as its main components.

The detailed configuration of the controller 40 is the same as that of the controller 10 described above. The storage device 50 includes multiple disk drives 51. The controller 40 is capable of controlling the disk drives 51 at a RAID level (for example level 0, 1, or 5) specified in the RAID scheme. In the RAID scheme, multiple disk drives 51 are managed as a single RAID group. Defined on the RAID group are multiple logical volumes 52, each of which is a unit of access from the secondary host system 5. A LUN (Logical Unit Number) is assigned to each logical volume 52.

Figures 2, 3:
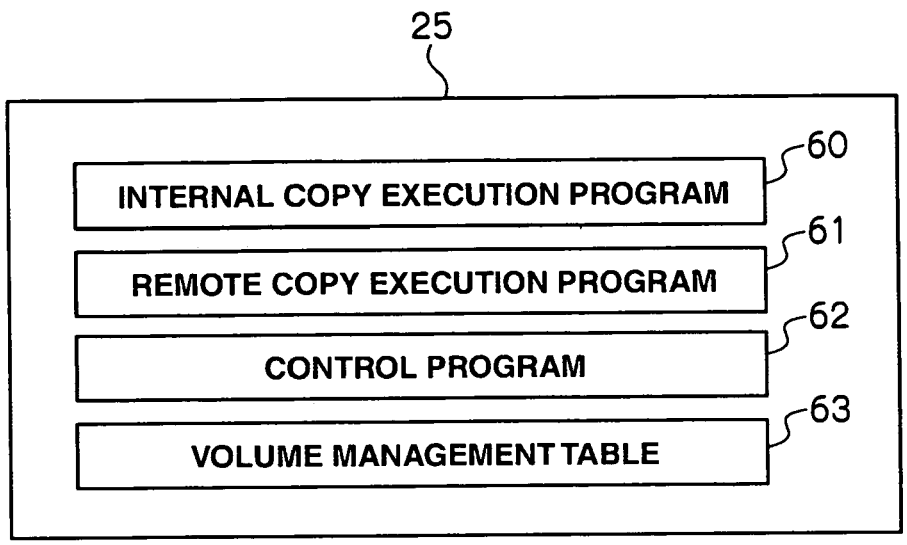
FIG. 2 is a conceptual diagram showing an example of information stored in a local memory.
FIG. 3 is a conceptual diagram showing an exemplary structure of a volume management table.

FIG. 2 shows micro programs and a volume management table.

The local memory 25 stores an internal copy execution program 60, a remote copy execution program 61, a control program 62, and a volume management table 63. The internal copy execution program 60 performs internal copy processing and snapshot update processing. The remote copy execution program 61 performs remote copy. The control program 62 controls the internal copy execution program 60 and the remote copy execution program 61. The volume management table 63 stores information about the multiple logical volumes 52.

FIG. 3 shows a structure of the volume management table 63.

Stored in the volume management table 63 are volume IDs (VOL-IDs), each identifying each of the logical volumes (hereinafter sometimes abbreviated to "VOL") 31, path information indicating the access path to the logical volume 31, the type of the logical volume 31 (hereinafter abbreviated to "VOL type"), a flag indicating whether or not the logical volume 31 is a pool VOL (hereinafter denoted as "pool VOL flag"), and information about a VOL pair including the logical volume 31 (hereinafter referred to as "pair information"), in association with one another for each of the multiple logical volume 31. At least one item of information in the information stored in the volume management table 63 (for example the VOL-ID, VOL-type, or pool VOL flag) can be input from the management terminal 8 or the primary host system 4.

Examples of the VOL types include "primary", "secondary", and "pool". A VOL of "primary" type (hereinafter referred to as a "primary VOL" or "PVOL") is a VOL from which data is copied in a copy process (for example in a remote copy process). A VOL of "secondary" type is a VOL to which data is copied (hereinafter referred to as a "secondary VOL" or "SVOL") in a copy process (for example in a remote copy process). A secondary VOL has a storage capacity larger than or equal to that of a primary VOL. Path information is defined for both primary and secondary VOLs. For VOLs of "pool" type (hereinafter referred to as "pool VOLs"), path information is not defined. Details of the pool VOLs will be described later.

The pool VOL flag indicates whether the logical volume 31 associated with it is a pool VOL or not. Specifically, if the pool VOL flag is configured to "1", its associated logical volume is a pool VOL; if the pool VOL flag is configured to "0", its associated logical volume is not a pool VOL.

The pair information includes, for example, counterpart information and pair status. The counterpart information includes information about the other logical volume 31 in its pair (hereinafter referred to as the counterpart VOL), the ID of the storage controller including the counterpart VOL, the VOL-ID, and path information of the counterpart VOL. The pair status includes "SMPL", "COPY", "PAIR", "PSUS", "SPLIT", and "SSWS", for example.

"SMPL" indicates that there is not a primary-secondary relation because the pair has not yet been created.

"COPY" indicates a copy in-progress state in which data is being copied from the primary VOL to the secondary VOL. In the "COPY" state, write to the secondary VOL is prohibited.

"PAIR" indicates a state in which asynchronous copy from the primary VOL to the secondary VOL is in progress. In the "PAIR" state, write to the secondary VOL is prohibited.

"PSUS" indicates that asynchronous copy from the primary VOL to the secondary VOL is suspended. In the "PSUS" state, read/write to the secondary VOL is prohibited.

"SPLIT" indicates a state in which the primary VOL and the secondary VOL are logically split from each other and only the difference data in the primary VOL before and after updates is copied to the secondary VOL.

"SSWS" indicates a state in which data can be read/written in the secondary VOL. In the "SSWS" state, data in the secondary VOL is restored to the previous fully formed state and the primary VOL changes to "PSUS" state.

The CPU 22 can refer to the volume management table 63 to identify the type of a logical volume 31 to access and its pair information. When a pool VOL is assigned to a virtual VOL, which will be described later, the CPU 22 can define information representing the path to the pool VOL and register the defined path information in the volume management table 63. The CPU 22 also can delete the path information about a pool VOL that is no longer assigned, thereby re-configuration the pool VOL to an unused state. The CPU 22 can determine whether a pool VOL is used or unused, on the basis of whether path information is registered for the pool VOL.

Figure 4:
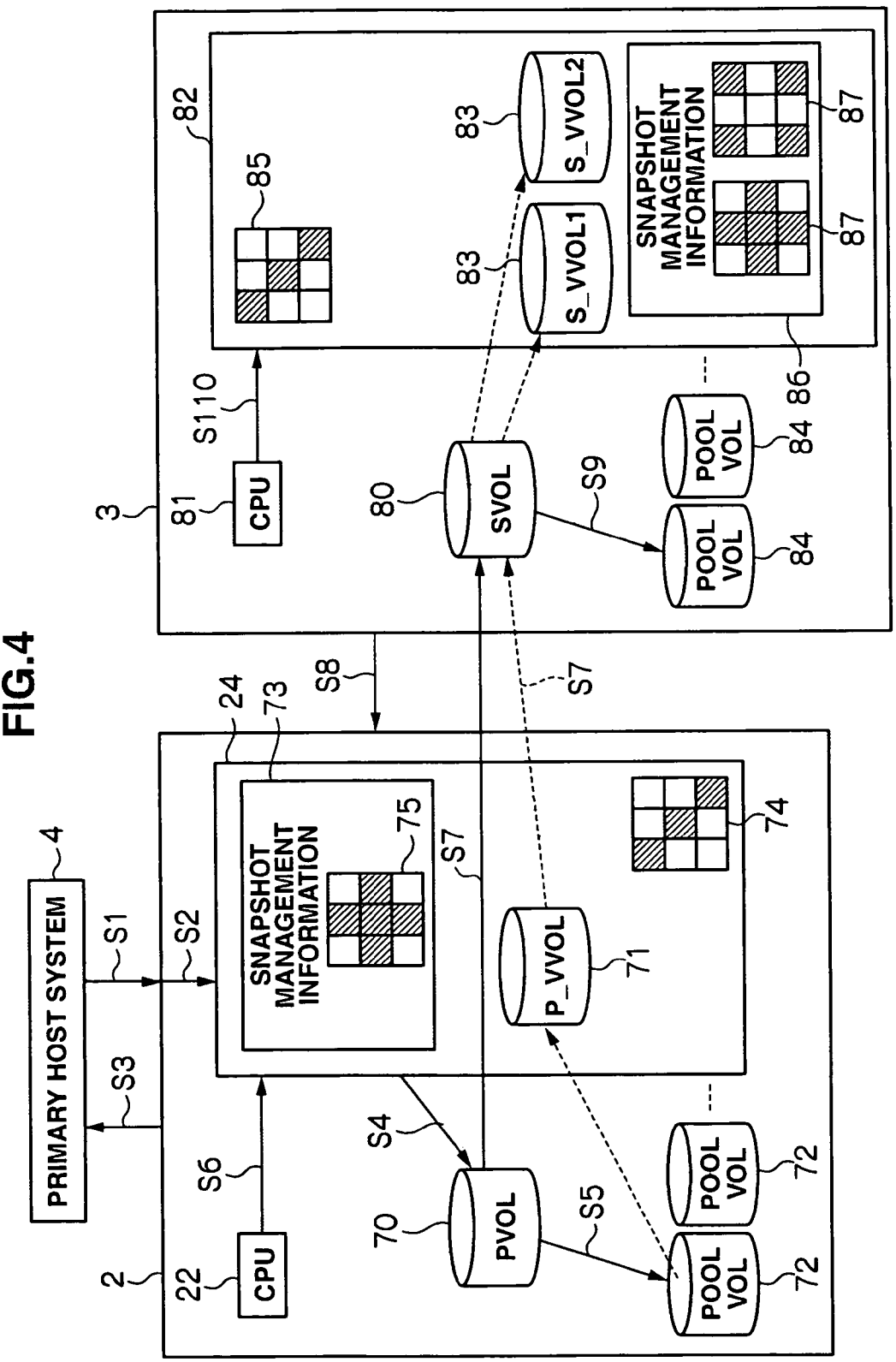
FIG. 4 is a conceptual diagram used for illustrating a process flow in the storage system.

FIG. 4 shows an overview of an asynchronous remote copy process performed by the first storage controller 2.

The first storage controller 2 includes a CPU 22, a cache memory 24, a primary VOL 70, a virtual VOL 71, a number of pool VOLs 72, snapshot management information 73, and a transfer differential bitmap table 74.

The pool VOLs 72 are logical volumes used for saving difference data between a data image of the primary VOL 70, which is a production volume used by a user, and its updated data image when the data image is updated after the pair of the primary VOL 70 and a virtual VOL 71 is split. The capacity of each pool VOL is not fixed; as the amount of difference data to be saved increases, the storage areas out of the storage areas of the disk drives 30 that are not yet allocated to any volumes are allocated to the pool VOL incrementally in accordance with the amount of the increase. Thus, the first storage controller 2 can dynamically accommodate decreases and increase in the amount of difference data.

The virtual VOL 71 is a virtual logical volume used for restoring data image of the primary VOL 70 at a given time from the data stored in the primary VOL 70 at the given time and the data saved from the primary VOL 70 to a pool VOL 72 after the given time. The virtual VOL 71 is capable of logically holding a snapshot of the primary VOL 70. The virtual VOL 71 can pair up with the primary VOL 70 or the secondary VOL 80. While an example is shown in the present embodiment in which the virtual VOL 71 is provided in a memory area of cache memory 24, it may be provided in a storage area of a disk drive 30 (FIG. 1). For convenience of explanation, the virtual VOL 71 will sometimes be abbreviated to P_VVOL.

The CPU 22 can select one or more pool VOLs (for example an unused pool VOL associated with no VOL) from among the multiple pool VOLs 72 and assign the pool VOL(s) 72 to the virtual VOL 71. The CPU 22 can change the number of pool VOLs 72 assigned to the virtual VOL 71 according to the consumption of storage resources.

The snapshot management information 73 is used for restoring a data image of the primary VOL 70 at a given time by using the snapshot function. The CPU 22 can check the snapshot management information 73 to determine which of the pool VOL 72 and the primary VOL 70 contains data constituting the data image of the primary VOL 70 at a given time, and can obtain the data from the VOL 72 or 70 containing the data to restore the data image of the primary VOL 70 at the given time into the virtual VOL 71. The snapshot management information 73 includes a differential bitmap table 75 which indicates the data update position on the primary VOL 70.

The transfer differential bitmap table 74 indicates the position of difference data (in other words, the data update position on the primary VOL 70) to be remote-copied to the secondary VOL 80 when data in the primary VOL 70 is updated after data in the primary VOL 70 has been initial-copied to the secondary VOL.

The CPU 22 can change the pair status of the primary VOL 70 and the virtual VOL 71 to the COPY state. When data is written in the primary VOL 70 while the pair status of the primary VOL 70 and the virtual VOL 71 is the COPY state, the CPU 22 writes the data onto the virtual VOL 71 or a pool VOL 72.

The CPU 22 can change the pair status of the primary VOL 70 and the virtual VOL 71 to the split state. When data is written in the primary VOL 70 during the sprit state of the pair status of the primary VOL 70 and the virtual VOL 71, the CPU 22 starts the internal copy program 60 (FIG. 20) to perform an internal copy process and a snapshot update process.

The second storage controller 3 includes a CPU 81, a cache memory 82, a secondary VOL 80, multiple virtual VOLs 83, multiple pool VOLs 84, a snapshot management information 73, and a transfer differential bitmap table 85.

The pool VOLs 84 are logical volumes for saving difference data between a data image of the secondary VOL 80 and its updated version when the data image is updated after the pair of the secondary VOL 80 and a virtual VOL 83 has been split.

The virtual VOLs 83A, 83B are virtual logical volumes used for restoring the data image of the secondary VOL 80 at a given time from data stored in the secondary VOL 80 at the given time and data saved from the secondary VOL 80 to the pool VOL 84 after the given time. The virtual VOLs 83 are capable of logically holding a snapshot of the secondary VOL 80. While an example is shown in the present embodiment in which the virtual VOLs 83 are provided in memory areas of the cache memory 82, they may be provided in storage areas of disk drives 51 (FIG. 1). For convenience of explanation, the virtual VOL 83 will sometimes be abbreviated to S_VVOL.

The snapshot management information 86 is information for restoring a data image of the secondary VOL 80 at a given time by using the snapshot function. The CPU 81 can check the snapshot management information 86 to determine which of the pool VOL 84 and the secondary VOL 80 contains data constituting the data image of the secondary VOL 80 at a given and can obtain the data from the VOL containing the data to restore the data image of the secondary VOL 80 at the given time into a virtual VOL 83. The snapshot management information 86 includes a differential bitmap table 87 which indicates the data update position on the secondary VOL 80.

The transfer differential bitmap table 85 indicates the position at which data in the secondary VOL 80 was updated by remote-copying when data in the primary VOL 70 was updated after the data in the primary VOL 70 had been initial-copied to the secondary VOL 80.

An internal copy process, snapshot update process, and remote copy process will be detailed below. The assumption in the following description is that the pair status of the primary VOL 70 and the virtual VOL 71 is split.

When receiving a write access from the primary host system 4 (S1), the first storage controller 2 stores the write data in the cache memory 24 (S2) and then reports the completion of the write to the primary host system 4 (S3).

The CPU 22 reads out the write data written in the cache memory 24 and writes it into the primary VOL 70 (S4). At this point, the CPU 22 moves data before update (the previous data in the primary VOL 70 before being updated (overwritten) with the write data) from the primary VOL 70 to a pool VOL 72 (S5).

When internal copy is performed while the pair status of the primary VOL 70 and the virtual VOL 71 is split, pieces of data constituting the data image of the primary VOL 70 at a given time are distributed between the primary VOL 70 and a pool VOL 72.

Then, the CPU 22 updates the snapshot management information 73 to information for restoring the data image of the primary VOL 70 at the time the pair status of the primary VOL 70 and the virtual VOL 71 was split (hereinafter referred to as the split time point) from data stored in the primary VOL 70 at the split time point and from the data moved from the primary VOL 70 to the pool VOL 72 after the split time point (S6). With this snapshot update, the virtual VOL 71 can logically hold the snapshot of the primary volume 70.

The CPU 22 performs steps S2 to S6 described above each time it receives a write access request from the primary host system 4 while the pair status of the primary VOL 70 and the virtual VOL 71 is split.

The CPU 22 starts the remote copy execution program 61 (FIG. 2) to perform remote copy after a predetermined time has lapsed since the split. The remote copy execution program 61 merges the differential bitmap table 75 into the transfer differential bitmap table 74. The remote copy execution program 61 then determines, on the basis of the transfer differential bitmap table 74, which of the primary VOL 70 and the pool VOL 72 contains data for restoring the data image of the primary VOL 70 at the split time point, and obtains the data from the VOL containing the data and transfers it to the second storage controller 3 (S7). The remote copy process restores the data image of the primary VOL 70 at the split time point into the secondary VOL 80.

When receiving the data from the first storage controller 2, the second storage controller 3 reports the completion of the write to the first storage controller 2 (S8).

Subsequently, the CPU 81 moves data before update (the previous data in the secondary VOL 80 before being updated (overwritten) with the write data) from the secondary VOL 80 to a pool VOL 84 when writing data received from the first storage controller 2 into the secondary VOL 80 (S9).

The CPU 81 also updates the snapshot management information 86 to information for restoring the data image of the secondary VOL 80 at the split time point from data stored in the secondary VOL 80 at the split time and data moved from the secondary VOL 80 to the pool VOL 84 after the split time point (S10).

The CPU 81 uses the two virtual VOLs 83 alternately. Therefore, the CPU 81 can clear the differential bitmap table 87 associated with one of the virtual VOLs 83 while logically creating a snapshot of the secondary VOL 80 in the other virtual VOL 83. Clearing the differential bitmap table 87 requires much time. Using the two virtual VOLs 83 alternately enables creation of a snapshot and clear of the differential bitmap table 87 to be performed concurrently, thereby increasing the efficiency.

FIG. 5 shows an asynchronous remote copy process sequence performed in the first storage controller 2.

Asynchronous remote copy starts with initial copy between the first storage controller 2 and the secondary storage controller 3 in which all data in the primary VOL 70 is copied to the secondary VOL 80 in accordance with an asynchronous remote copy execution instruction provided from the primary host 4 to the first storage controller 2. After completion of the initial copy, the pair status of the primary VOL 70 and the virtual VOL 71 is split in the first storage controller 2.

Time t0 in FIG. 5 indicates the split time point at which the pair status of the primary VOL 70 and the virtual VOL 71 is split. The data image of the primary VOL 70 at time t0 is referred to as "Image T0". It is assumed that Image T0 is the data image of the primary VOL 70 in which data block A is stored in a first block area of the primary VOL 70. At time t0, data before update is not stored in the pool VOL 72. The snapshot management information 73 is information for restoring Image T0.

At time t1 (that is, during the time period of the split state), the data in the first block area of the primary VOL 70 is overwritten with data block B and accordingly the data image T0 of the primary VOL 70 changes to Image T1. At this time, the internal copy execution program 60 writes data block A (data before update) from the primary VOL 70 to the pool VOL 72 and updates the snapshot management information 73 to information indicating that the first block area of the primary VOL 70 has been updated and data block A (data before update) that was in the first block region has been stored in the pool VOL 72.

Also at time t1, the control program 62 (FIG. 2) instructs the remote copy execution program 61 to execute a remote copy process. The remote copy execution program 61 refers to the transfer differential bitmap table 74 to identify that data block constituting Image T0 exists in the pool VOL 72, obtains data block A from the pool VOL 72, and sends data block A to the second storage controller 3.

At time t2, the remote copy process is completed. As a result, Image T0 created on the primary VOL 70 at time t0 is duplexed on the secondary VOL 80.

Also at time t2 (that is during the time period of the split state), data block C is written in a second block area of the primary VOL 70 and accordingly the data image of the primary VOL 70 changes from Image T1 to Image T2. The internal copy execution program 60 (FIG. 2) updates the snapshot management information 73 to indicate that the second block area of the primary VOL 70 has been updated.

At a time point after time t2 but before time t3 for example, the data in the second block area of the primary VOL 70 is overwritten with data block D and accordingly the data image T2 of the primary VOL 70 changes to Image T3 (data image in which data block B is in the first block area and data block D is in the second block area). At this time, the internal copy execution program 60 moves data block C (data before update) from the primary VOL 70 to the pool VOL 72 and updates the snapshot management information 73 to indicate that the second block area of the primary VOL 70 has been updated and data block C that was in the second block area has been stored in the pool VOL 72.

Then, before the primary VOL 70 is updated, the primary VOL 70 and the virtual VOL 71 is split at time t3.

At time t3, in other words, when they are split, the CPU 22 erases all data before update stored in the pool VOL 72 for the purpose of logically holding Image T3 of the primary VOL 70 at time t3 in the virtual VOL 71.

The CPU 22 also updates the snapshot management information 73 from information for restoring Image T0 to information for restoring Image T3. Specifically, because the primary VOL 70 has not yet been updated at time t3, the CPU 22 updates the snapshot management information 73 to information indicating the primary VOL 70 is yet to be updated.

At time t4, the data in the second block region of the primary VOL 70 is overwritten with data block E and accordingly the data image of the primary VOL 70 changes from Image T3 to Image T4. The internal copy execution program 60 writes data block D (data before update) from the primary VOL 70 to the pool VOL 72 and updates the snapshot management information 73 to indicate that the second block area of the primary VOL 70 has been updated and data block D that was in the second block area has been moved to the pool VOL 72.

Remote copy is performed at time t4. The remote copy execution program 61 (FIG. 2) refers to the transfer differential bitmap table 74 and knows that data block B constituting Image T3 is in the primary VOL 70, because the first block area of the primary VOL 70 has not been updated, and also knows that data block D, which is another block constituting Image T3, is in the pool VOL 72, because the second block area of the primary VOL 70 has been updated. The remote copy execution program 61 obtains data block B from the primary VOL 70, obtains data block D from the pool VOL 72, and transfers data blocks B and D to the second storage controller 3.

At time t5, the remote copy process is completed. As a result, Image T0 in the secondary VOL 80 is updated to Image T3 of the primary VOL 70 as it was at time t3. That is, data block A in the first block area of the secondary VOL 80 is overwritten with data block B and data block D is written in the second block area of the secondary VOL 80.

After that, the second storage controller 3 holds Image T3 until it receives data constituting Image T6 at the next split time point t6.

The process performed in the period from time t3 to time t5 is repeated at predetermined time intervals (15 seconds). The predetermined interval is hereinafter referred to as a cycle and the duration of the cycle is referred as cycle time.

That is, in the first storage controller 2, the primary VOL 70 and the virtual VOL 71 are split at intervals of 15 seconds at which the cycle is repeated. A remote copy process is performed in the period during which they are kept split and before the next time they are split (in other words, concurrently with an internal copy process and a snapshot update process). After completion of the remote copy process, the primary VOL 70 and the virtual VOL 71 are split again and data before update is deleted from the pool VOL 72. By repeating the process, the data images of the primary VOL 70 at time points at which a split is performed at the regular intervals (Image T0 at time t0, Image T3 at time t3, and Image T6 at time t6 in the example in FIG. 5) can be logically held in the virtual VOL 71 and the data image can be copied to the secondary VOL 80.

Figure 6:
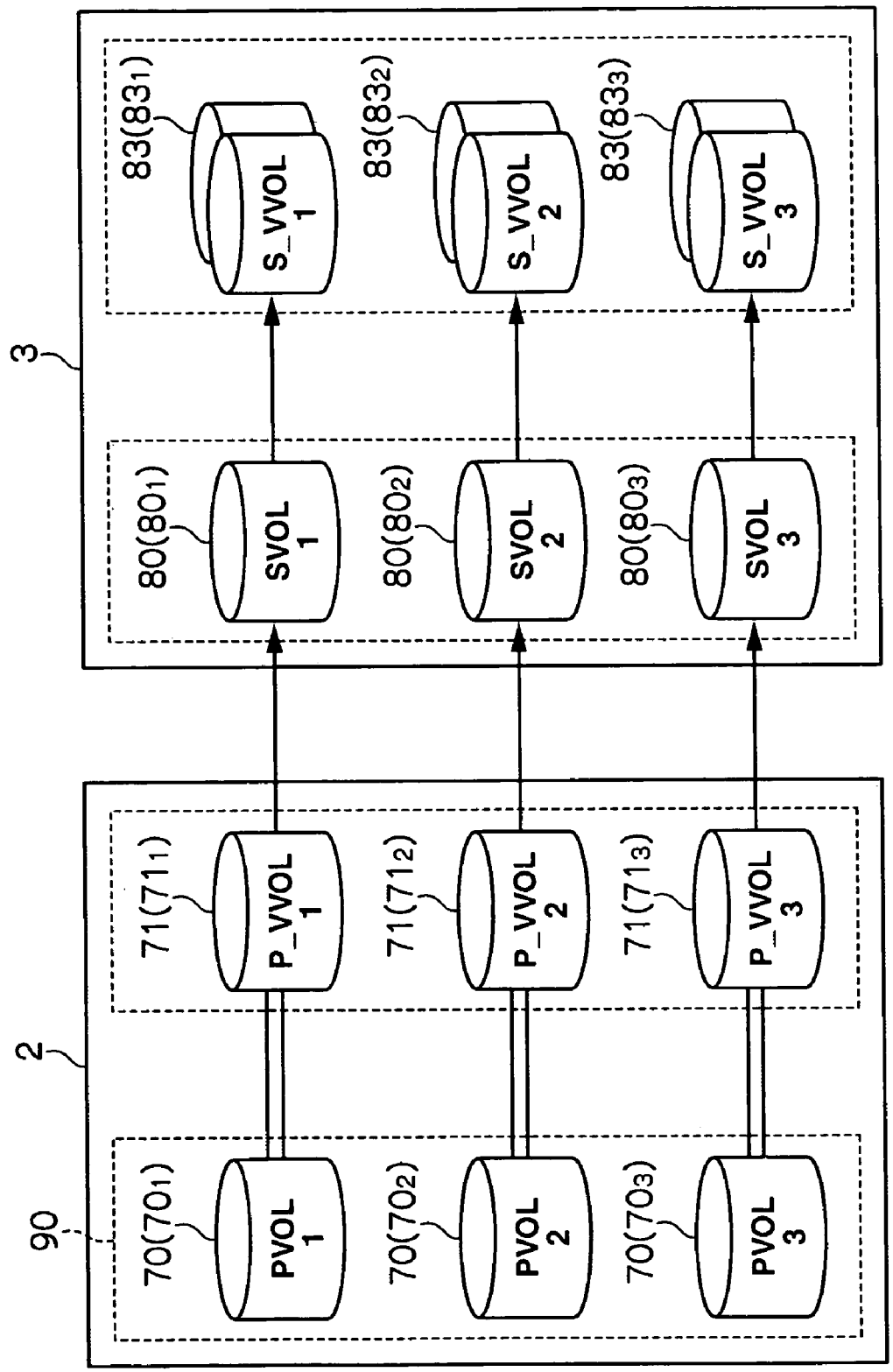
FIG. 6 is a conceptual diagram used for illustrating consistency groups.

In the storage system 1, such a remote copy process can also be applied to a consistency group 90 (FIG. 6) as well as a single primary VOL 70. A consistency group 90 is a primary VOL group configured of a number of related primary VOLs 70 ($70_1$-$70_3$) such as a primary VOL $70_1$ storing database data, for example, a primary VOL $70_2$ storing log data concerning the database, and a primary VOL $70_3$ storing configuration information for the database, as shown in FIG. 6. A consistency group 90 is configured for each application running on the host if required.

In the storage system 1, virtual VOLs $71_1$-$71_3$ can be created in the first storage controller 2 in association with the primary VOLs $70_1$-$70_3$, respectively, in a desired consistency group 90, and secondary VOLs $80_1$-$80_3$ and virtual VOLS $83_1$-$83_3$ can be created in the second storage controller 3 in association with the primary VOLs $70_1$-$70_3$, respectively. Furthermore, in the storage system 1, one can issue from the primary host system 4 an instruction to remote-copy the consistency group 90 to cause the data image of each primary VOL belonging to the consistency group 90 to be copied to its associated secondary VOL $80_1$-$80_3$ in the second storage controller 3 through the associated virtual VOL $71_1$-$71_3$ in the first storage controller 2 by following the process described above with reference to FIG. 5.

Figure 7:
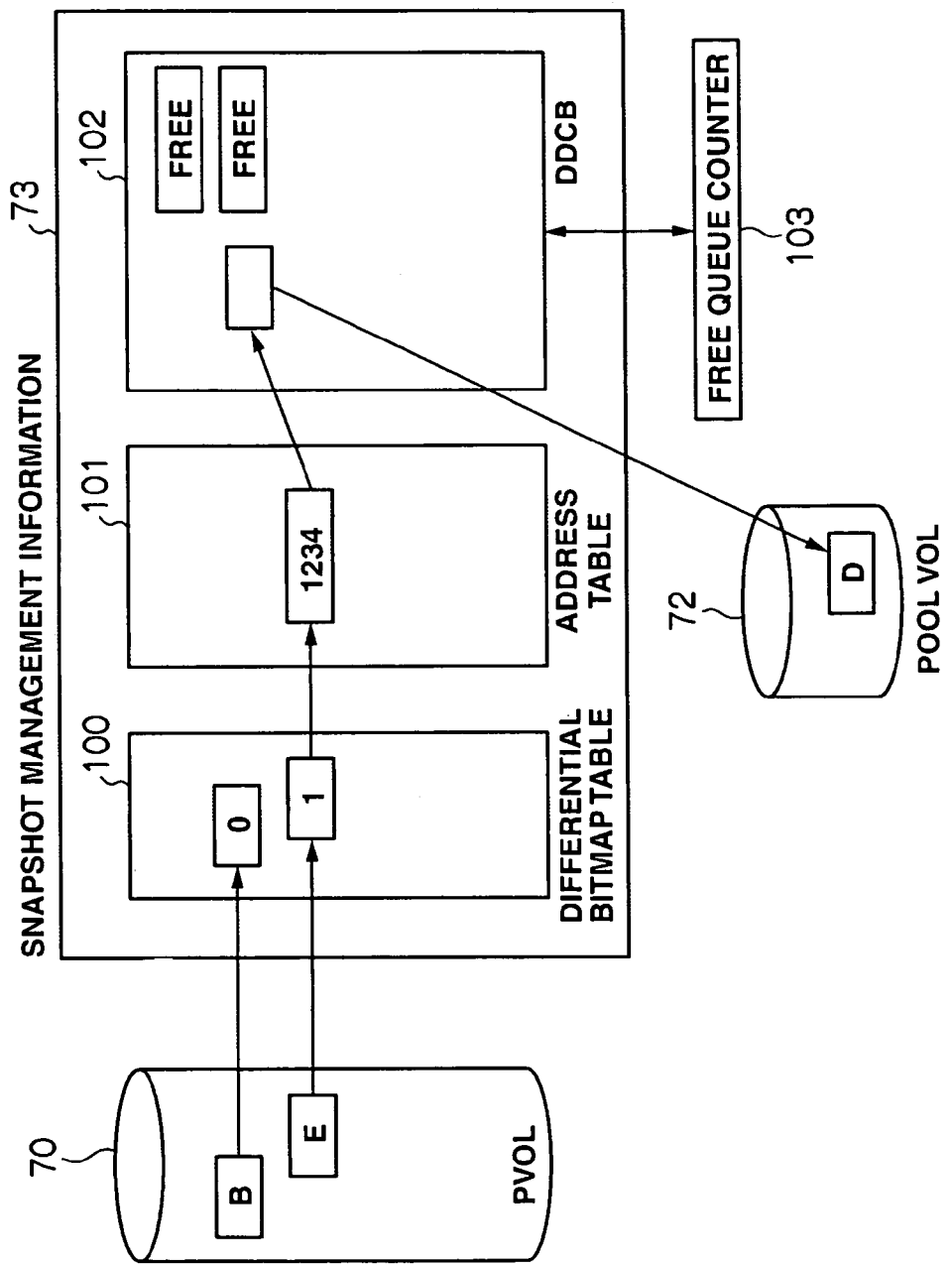
FIG. 7 is a conceptual diagram used for illustrating an overall flow including a split state starting time and a remote copy execution time.

FIG. 7 shows an overview of a snapshot update process according to the present embodiment and, in particular, shows how the data image of a primary VOL 70 changes from Image T3 to Image T4 and how Image T3 is logically held by a virtual VOL 71.

Snapshot management information 73 includes a differential bitmap table 100, an address table 101, and a difference data control block (DDCB) 102.

The differential bitmap table 100 contains a number of bits associated with the multiple block regions (each 64 Kbytes large, for example) in the primary VOL 70. When the data image changes from Image T3 to Image T4, for example, a first block area in the primary VOL 70 is not updated, therefore the bit associated with the first block area remains "0", as shown in FIG. 7. Data block b in a second block area is overwritten with data block E, therefore the bit associated with the second block area is updated from "0" to "1".

The address table 101 has address areas associated with the multiple block areas in the primary VOL 70. If there is data before update that corresponds to a given block area, stored in the given block area is an address on the difference data control block 102 that corresponds to that address area.

The difference data control block 102 has management areas associated with the multiple block areas in a pool VOL 72, for example.

Recorded in each management area is information indicating the level of the snapshot of before-update data stored in a location corresponding to a block area in the pool VOL 72. The CPU 22 can obtain before-update data at multiple levels by following management areas.

Unused areas in the difference data control block 102 are managed as free queues. The free queues are managed through a free queue counter 103.

Thus, the arrangement described above enables data in the primary VOL 70 at the time of creation of a snapshot to be logically copied to virtual VOL 71. The difference data control block 102 manages information indicating at which level before-update data in the virtual VOL 71 is.

(2) Functions Included in Storage System

Functions included in the storage system 1 will be described below.

(2-1) Capability of Creating Multiple Pools

When the amount of data write from the primary host system 4 to a particular primary VOL 70 in the storage system 1 increases and exceeds the amount of difference data transferred from the first storage controller 2 to the second storage controller 3, difference data for the primary VOL 70 uses much of the storage space in the pool VOL 72 and eventually the storage space is exhausted. Therefore, if the first storage controller 2 were designed so that all primary VOLs 70 in the first storage controller 2 share a single pool VOL 72, an increase of the amount of data write to a particular primary VOL 70 would impact the entire storage system 1.

To address the problem, the storage system 1 is configured in such a manner that multiple pool VOLs 72 can be provided in the first storage controller 2 and a different pool VOL 72 can be assigned to each pair of a consistency group 90 (FIG. 6) and its associated secondary VOL 80 or a pair of a primary VOL 70 that do not belong to any of the consistency groups and its associated secondary VOL 80 (hereinafter these pairs are referred to as copy pairs). This configuration can prevent an increase in the amount of data write to a particular consistency group 90 or a primary VOL 70 that does not belong to any consistency group from adversely impacting the other copy pairs including consistency groups 90 or the other copy pairs including primary VOLs 70 that does not belong to any consistency group.

Figure 8:
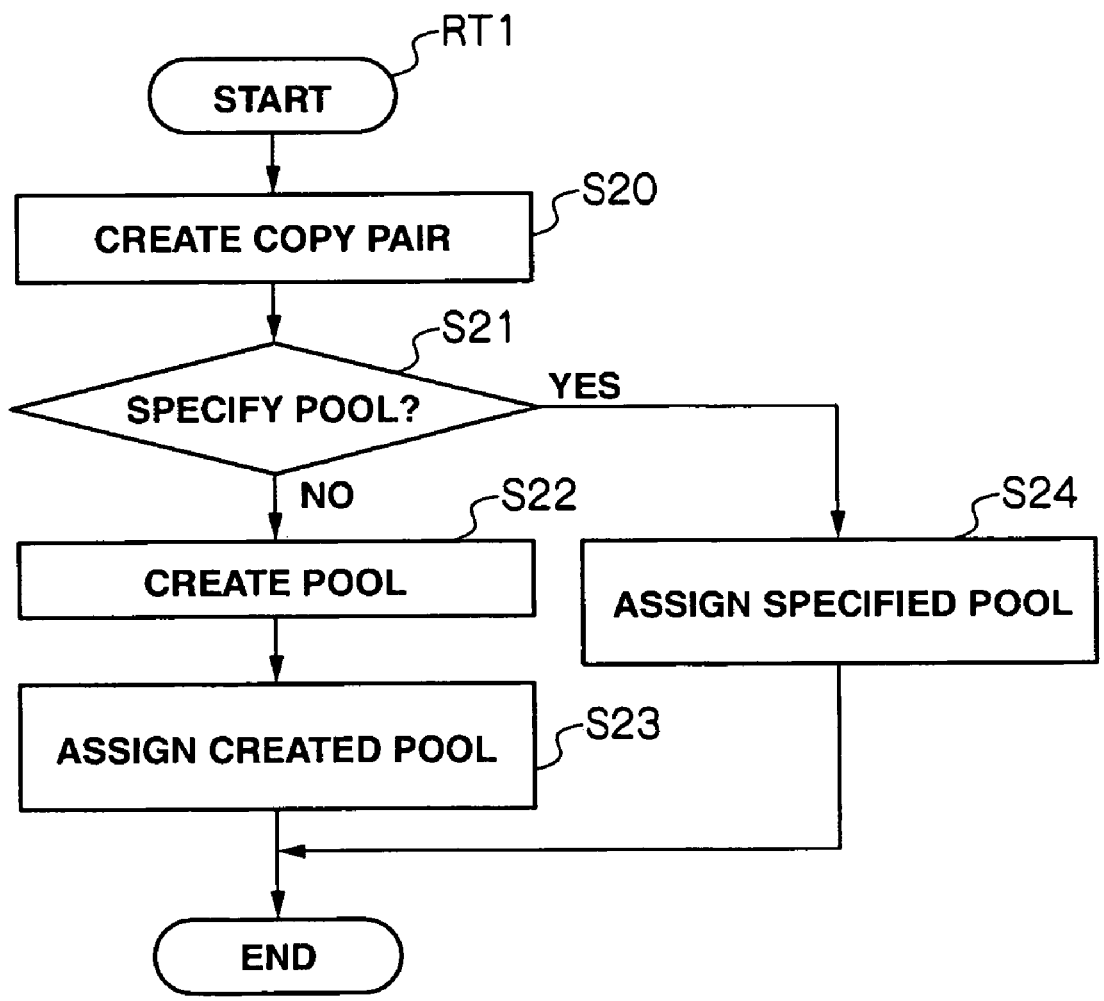
FIG. 8 is a flowchart illustrating a process for assigning a pool.

FIG. 8 is a flowchart of a process performed by the CPU 22 in the first storage controller 2 for assigning a pool VOL 72 to such a copy pair.

When the CPU 22 receives a command to configure a new copy pair from the primary host system 4 (the command is referred to as a pair configuring command), the CPU 22 assigns a new pool VOL 72 to the copy pair by following the pool assignment process RT1 shown in FIG. 8 in accordance with an internal copy execution program 60 stored in the local memory 25.

In particular, when receiving a pair configuration command from the primary host system 4, the CPU 22 first creates the specified copy pair (S20), and then determines whether the user has specified a desired pool VOL 72 for the created copy pair (S21).

More specifically, in the storage system 1, when a user inputs a command to create a copy pair on the primary host system 4, the user can choose whether to specify a pool VOL to assign to the copy pair or cause the first storage controller to automatically assign one. The result of the choice is contained in the pair configuration command and provided from the primary host system 4 to the first storage controller 2. Thus, the CPU 22 determines on the basis of the pair configuration command whether the user has specified a desired pool VOL 72 for the copy pair created at step S20.

If the result of the determination is negative (S22: NO), the CPU 22 creates a new pool VOL 72 with a predetermined capacity in association with the copy pair created at step S20 (S22), assigns the pool VOL 72 to the copy pair (S23), and then ends the process.

On the other hand, if the result of the determination at step S21 is affirmative (S24: YES), the CPU 22 assigns the pool VOL 72 specified by the user, which the CPU 22 can identify from the pair configuration command, to the copy pair (S24), and then ends the process.

Thus, in the storage system 1, the CPU assigns, at each time of creation of a new copy pair, a pool VOL 72 specified to the copy pair.

Two or more pool VOLs 72 may be assigned to new copy pairs in common (for example already created pool VOLs 72 may be assigned to several copy pairs). Specifically, a first pool VOL 72 among a number of pool VOLs 72 may be assigned to a first copy pair and a second pool VOL 72 may be assigned to second and third copy pairs.

(2-2) Difference Data Transfer Control Function

Figure 9:
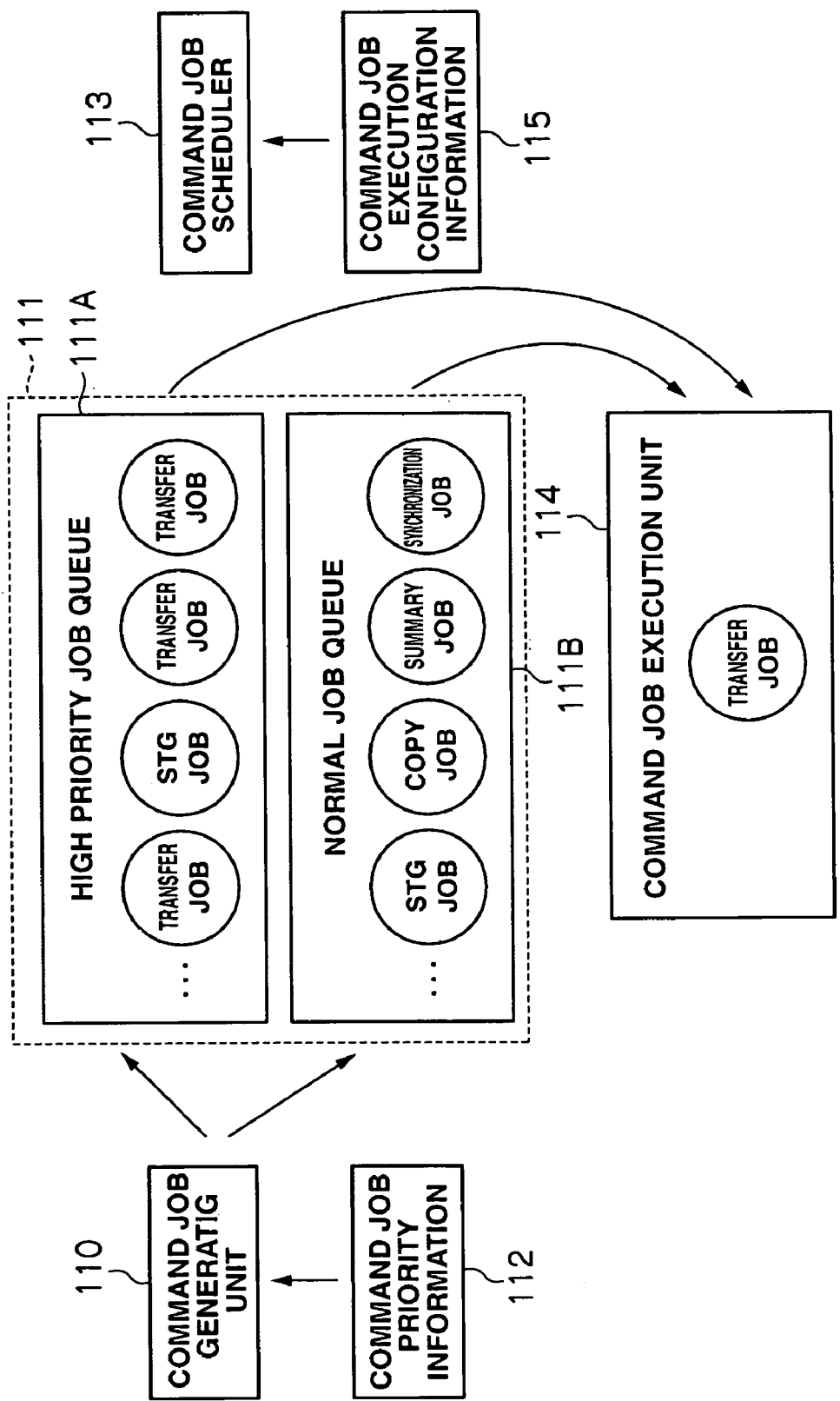
FIG. 9 is a conceptual diagram used for illustrating a command job prioritization function.

A difference data transfer control function used in the storage system 1 will be described below. Referring to FIG. 9, a command job prioritization function included in the first storage controller 2 will be first described. FIG. 9 shows functionally grouped processing relating to the command job prioritization function performed by the CPU 22 in the first storage controller 2.

When a job (processing) to be performed by the CPU 22 occurs in the first storage controller 2, a command called a command job that specifies specific processing of the job is generated by a command job generating unit 110 and such command jobs are sequentially stored in a memory area called a job queue 111.

Two job queues 111, a high-priority job queue 111A and a normal job queue 111B, are provided in the first storage controller 2. The high-priority job queue 111A holds command jobs with higher priorities (levels of precedence of processing in time) assigned beforehand and the normal job queue 111B holds "normal" jobs with lower priorities.

Information indicating the priorities of command jobs that are assigned by a user or an administrator beforehand (hereinafter referred to as command job priority information 112) is stored in the local memory 25 (FIG. 1) of the first storage controller 2.

When a job to be executed by the CPU 22 occurs, the command job generating unit 110 generates as many instances of the command job as a number proportional to the priority of the command job, on the basis of the command job priority information 112. The maximum number of instances of a command job which can be generated is predetermined in accordance with the priority of the command job. The higher the priority of a command job, the more instances of the command job can be generated.

Then, if the priority of the generated command job indicated by the command job priority information 112 is higher than a predetermined threshold, the command job generating unit 110 provides the generated instances of the command job to the high-priority job queue 111A; otherwise, the command job generating unit 110 provides the instances of the command job to the normal processing queue 111B.

The command jobs stored in the high-priority job queue 111A or normal job queue 111B are then sequentially read out from the job queue 111 by a command scheduler 113 and provided to a command job execution unit 114.

Stored in the local memory 25 of the first storage controller 2 is command job execution configuration information 115 specified by a user or an administrator beforehand, such as the ratio between the number of command jobs to be read from high-priority job queue 111A and that of the command jobs to be read from the normal job queue 111B, that specifically defines how command jobs stored in the high-priority job queue 111A are given precedence.

Before reading a command job stored in the high-priority job queue 111A or normal job queue 111B, the command job scheduler 113 refers to the command job execution configuration information 115 and generates a schedule that specifies the order in which the command jobs are to be read. For example, a schedule may be generated such that three command jobs stored in the high-priority job queue 111A are to be executed and then two command jobs stored in the normal job queue 111B are to be executed, and so on.

The command scheduler 113 then reads command jobs from the high-priority job queue 111A or the normal job queue 111B one by one according to the schedule and provides them to the command job execution unit 114. The command job execution unit 114 sequentially executes the provided command jobs.

In the storage system 1 according to this embodiment, a higher priority is assigned to a command job that transfers difference data between the first and second storage controllers 2, 3 (hereinafter referred to as the difference data transfer command job) so that it is provided to the high-priority job queue 111A, in order to reduce the amount of data lost in the event of a failure. This enables the data transfer job to be executed without being affected from other jobs.

However, when the amount of data write from the primary host system 4 to a particular primary VOL 70 in the storage system 1 increases, the copy pair to which the primary VOL 70 belongs can occupy the bandwidth between the first and second storage controller 2, 3, which can adversely affects difference data transfer of other copy pairs.

To address this, the first storage controller 2 in the storage system 1 includes a difference data transfer control function that lowers the priority of a difference data transfer command job for such a copy pair in which the amount of difference data transfer has increased, thereby reducing the number of instances of the difference data transfer command job generated by the command job generating unit 110 for the copy pair.

Figure 10:
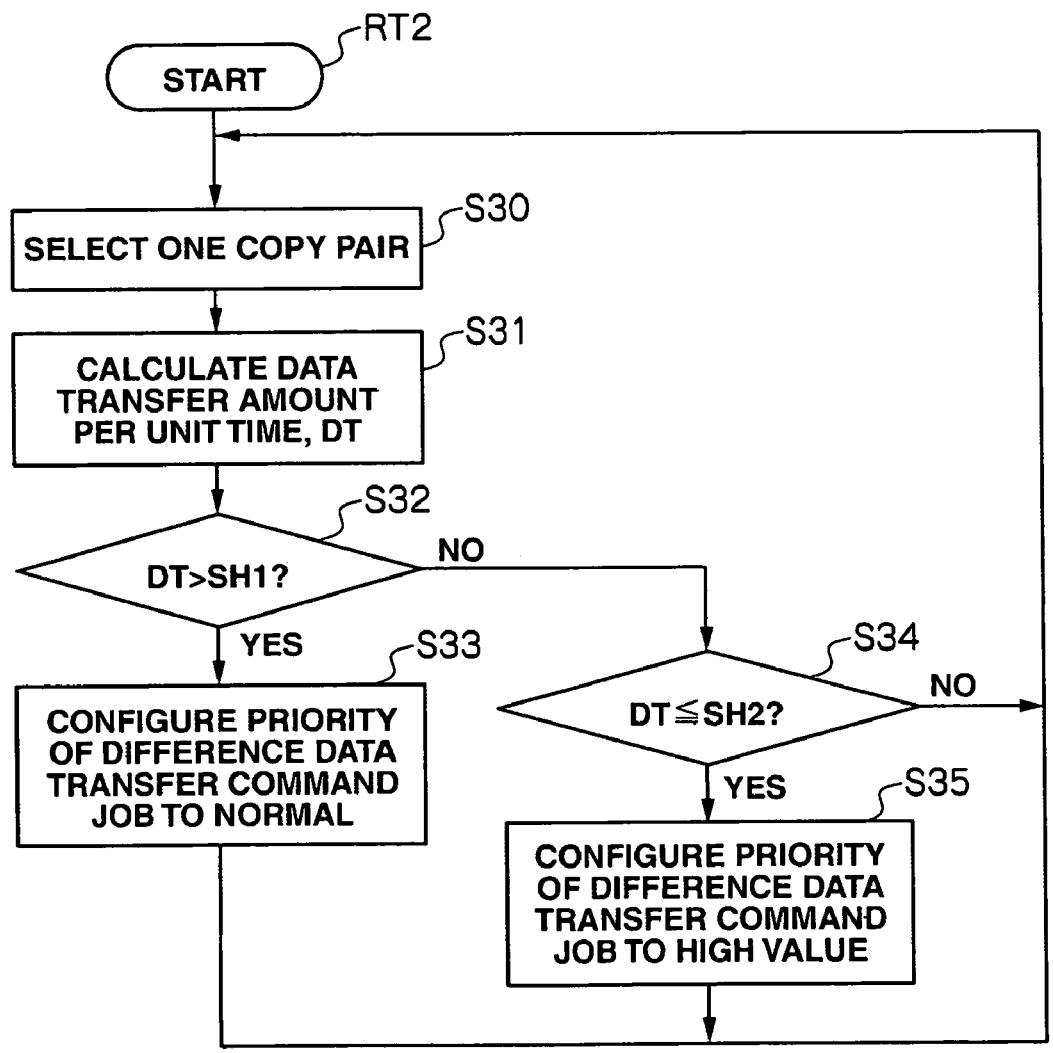
FIG. 10 is a flowchart illustrating a difference data transfer control process.

FIG. 10 is a flowchart of a process relating to the difference data transfer control function performed by the CPU 22 of the first storage controller 2. The CPU 22 performs the difference data transfer control process as stated above by following the difference data transfer control process RT2 shown in FIG. 10 according to a remote copy execution program 62 (FIG. 2) stored in the local memory 25.

Upon power-on of the first storage controller 2, the CPU 22 starts the difference data transfer control process and selects a copy pair on the basis of a volume management table 63 (FIG. 2) stored in the local memory 25 (S30).

The CPU 22 then calculates the amount of data transfer per unit time, DT, for the selected copy pair (S31). In this embodiment, in particular, the CPU 22 sequentially stores and maintains log information about the copy pairs configured in the first storage controller 2, including the time at which difference data was transferred from the first storage controller 2 to the second storage controller 3 and the amount of the transferred data. The CPU 22 calculates the data transfer amount per unit time DT of a copy pair on the basis of the log information about that copy pair among these pieces of log information at step S31.

The CPU 22 then determines whether or not the calculated data transfer amount DT exceeds a first threshold SH1 (S32). The first threshold SH1 is preset by a user or an administrator as the maximum allowable value of the data transfer amount per unit time for a single copy pair.

If the result of the determination is negative (S32: NO), then the CPU 22 updates the command job priority information 112 to decrease the priority of the difference data transfer command job for the copy pair by a predetermined degree, and then returns to step S30.

On the other hand, if the result of the determination is affirmative (S32: YES), the CPU 22 determines whether or not the data transfer amount per unit time DT of the copy pair calculated at step S31 exceeds a second threshold SH2 (S34). The second threshold SH2 is smaller than the first threshold SH1 and is preset by a user or an administrator as the maximum value of the data transfer amount per unit time of a copy pair below or at which a lowered priority of a copy pair can be re-configured to its initial value.

If the result of the determination is negative (S34: NO), then the CPU 22 returns to step 30, where it selects another pair and repeats the same process.

On the other hand, if the result of the determination at step S34 is affirmative (S34: YES), the CPU 22 updates the command job priority information 112 (FIG. 9) to raise the priority of the difference data transfer command job for the copy pair (S35). Then, the CPU 22 selects another copy pair and repeats the same process at step S30.

In this way, in the storage system 1, the priority of a difference data transfer command job of a copy pair in which the amount of data write from the primary host system 4 and therefore the amount of difference data transferred has increased can be lowered to prevent data transfer of the copy pair from occupying the bandwidth between the first and second storage controller 2, 3 and adversely affecting difference data transfer by the other copy pairs.

(2-3) Function of Maintaining Secondary Full-Formation Time (2-3-1) Function of Creating Multiple Virtual VOLs If the first storage controller 2 in the storage system 1 having the configuration as described above includes only one virtual VOL 71, an additional virtual VOL 71 (snapshot) cannot be created until data in the virtual VOL 71 is fully formed in a secondary VOL 80 in a second storage controller 3. Consequently, as the amount of data write from the primary host system 4 increases, the time required for data in the virtual VOL 71 in the first storage controller 2 to be fully formed in the secondary VOL 80 in the second storage controller 3 temporarily increases and accordingly the data transfer amount during one cycle increases. This can increase the amount of data lost in the event of a failure.

Figure 11:
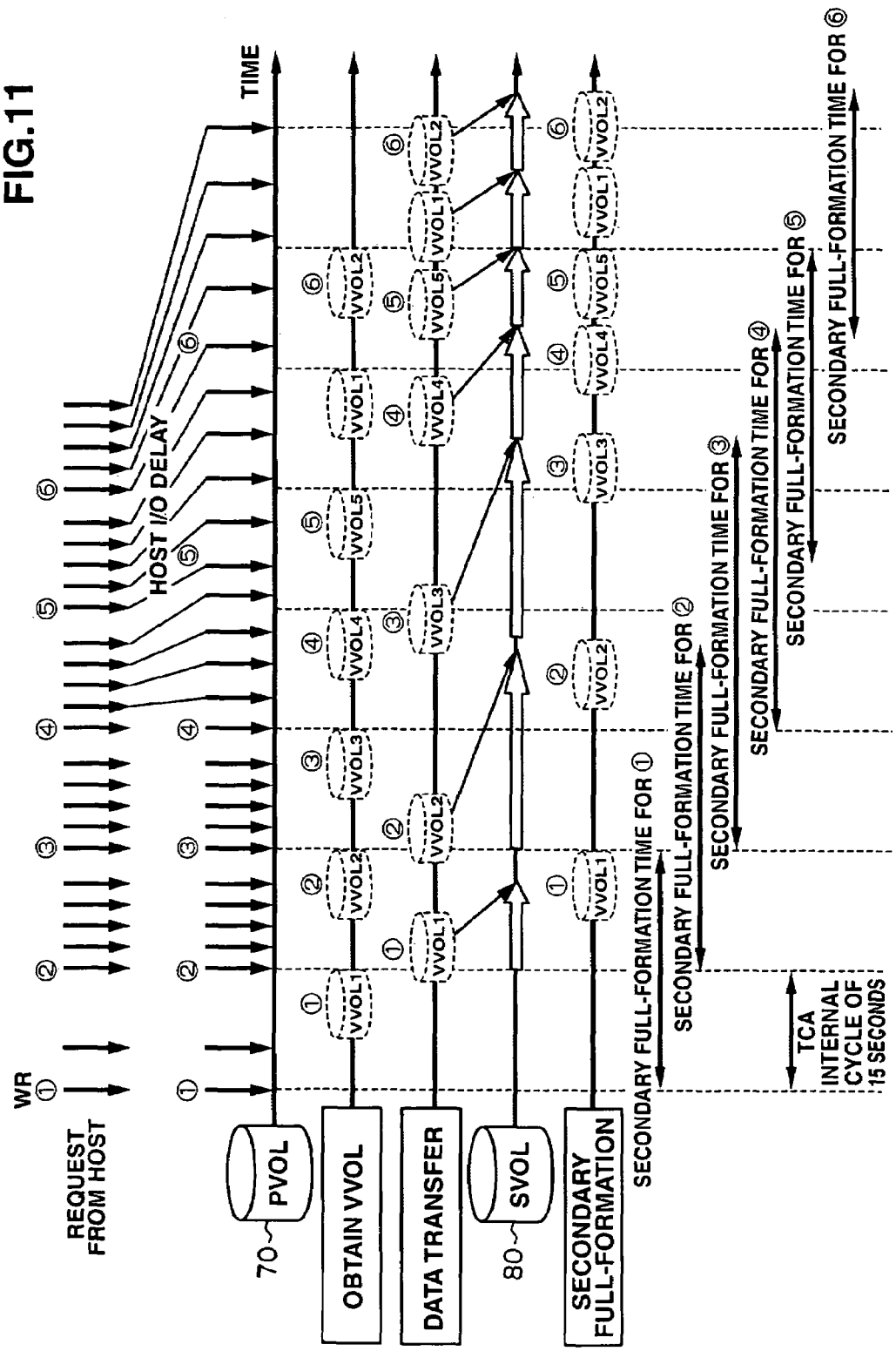
FIG. 11 is a sequence diagram used for illustrating a multiple virtual VOL creation function and an I/O delaying function.

To address this problem, the storage system 1 is designed in such a manner that multiple virtual VOLs 71 can be created in the first storage controller 2 for one copy pair, as shown in FIG. 11. Therefore, when the amount of data write from the primary host system 4 increases and consequently the time for starting a snapshot creation cycle is reached before the transfer of difference data of a snapshot created in the previous cycle is not yet complete, a new, temporary virtual VOL 71 can be generated. Thus, creation of snapshots can be continued at regular intervals. Furthermore, difference data of multiple snapshots accumulated as a result can be sequentially transferred to the second storage controller 3 after the amount of data write from the primary host system 4 decreases. Thus, an increase in the amount of untransferred difference data can be prevented.

Figure 12:
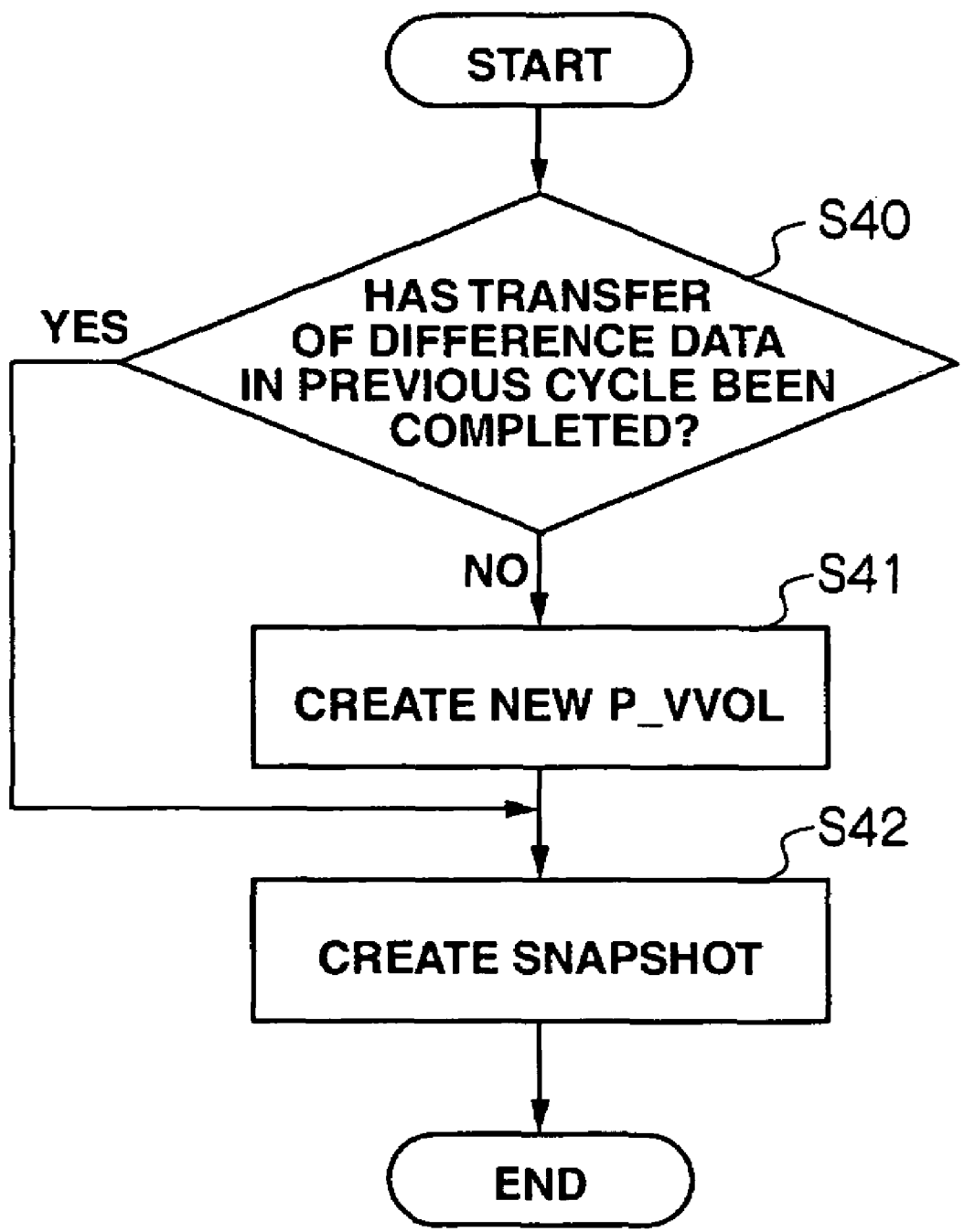
FIG. 12 is a flowchart of a snapshot creation process.

FIG. 12 is a flowchart of a process performed by the CPU 22 in the first storage controller 2 for crating such a virtual VOL 71. The CPU 22 creates a new virtual VOL 71 for each pair as required, by following the snapshot creation process RT3 shown in FIG. 11.

The CPU 22 starts the snapshot creation process RT3 at the beginning of a cycle at intervals of 15 seconds. The CPU 22 first determines whether or not difference data of the snapshot created in the previous cycle has been transferred to the second storage controller 3 (S40).

If the determination at step S40 is affirmative (S40: YES), it means that currently there is only one virtual VOL 71 in the first storage controller 2 and difference data of the snapshot stored in the virtual VOL 71 has already been transferred to the second storage controller 3. The CPU 22 then uses the virtual VOL 71 to create a snapshot of the primary VOL 70 (S41). Then the snapshot creation process in this cycle will end.

On the other hand, if the determination at step S40 is negative (S40: NO), it means that currently there is not a free virtual VOL 71 from which data has been transferred to the second storage controller 3. Then, the CPU 22 creates a new virtual VOL 71 (S41) and uses the virtual VOL 71 to create a snapshot of the primary VOL 70 (S42). Then, the snapshot creation process in this cycle will end.

In this way, the number of virtual VOLs 71 in the first storage controller 2 in the storage system 1 can be dynamically changed in accordance with the amount of data write from the primary host system 4, whereby an increase in the amount of data loss in the event of a failure can be effectively prevented.

(2-3-2) I/O Delaying Function

The storage system 1 also includes an I/O delaying function as another measure to deal with increases in the amount of data write from the primary host system 4. The I/O delaying function delays a response provided from the first storage controller 2 to the primary host system 4 to an I/O request provided from the primary host system 4 to the first storage controller 2.

Figure 13:
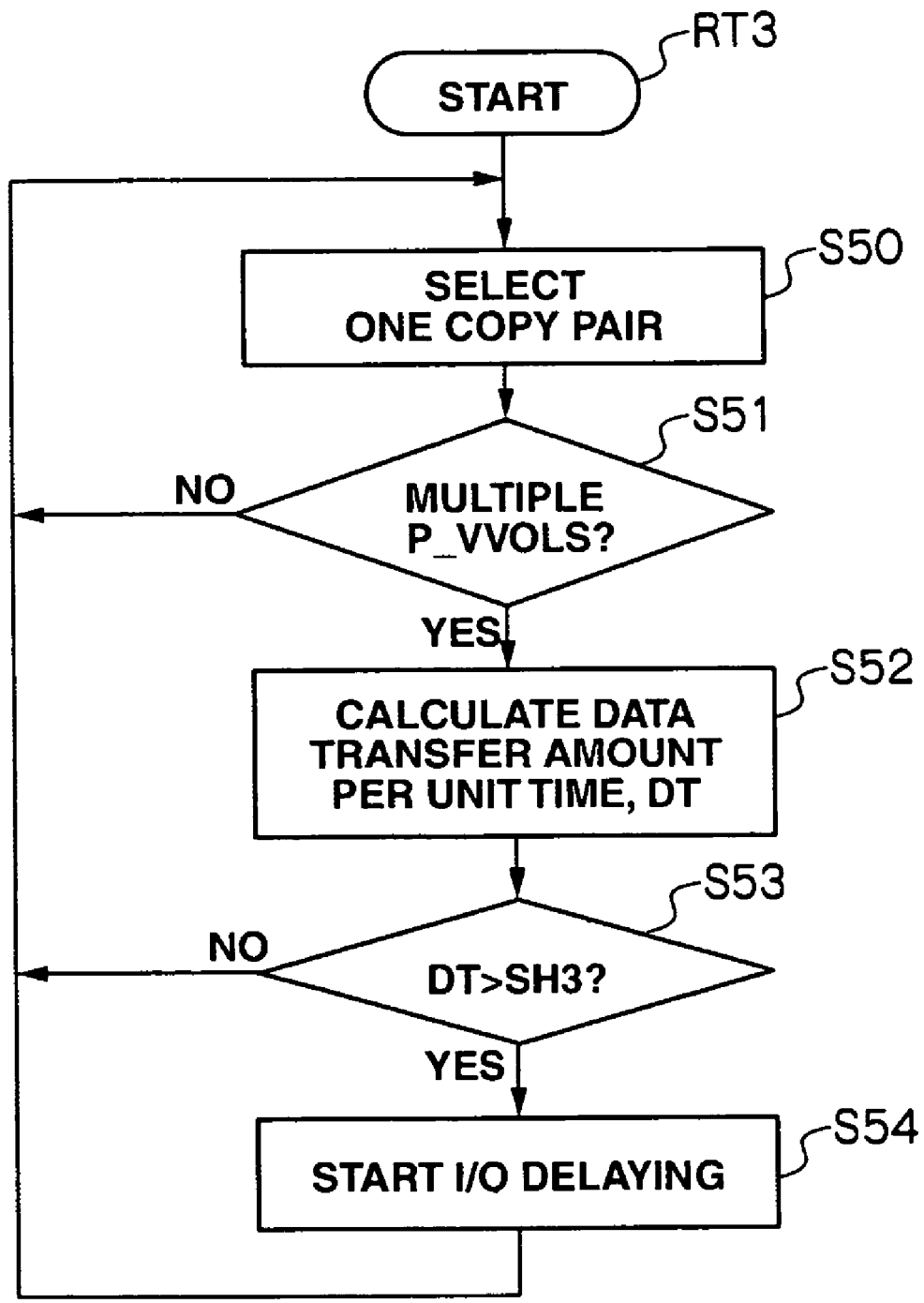
FIG. 13 is a flowchart of an I/O delaying start process.

FIG. 13 is a flowchart of a process relating to the I/O delaying function performed by the CPU 22 of the first storage controller 2. The CPU 22 reduces the amount of data write from the host system 4 when needed, by following the I/O delaying process shown in FIG. 13 in accordance with a given control program (not shown) stored in the local memory 25.

The CPU 22 first selects one copy pair (S50) and determines whether or not the first storage controller 2 includes more than one virtual VOL 71 for that copy pair (S51).

If the result of the determination at step S51 is negative (S51: NO), it means that, for the copy pair, the amount of data write from the primary host system 4 and the amount of data transferred to the second storage controller 3 are in balance. The CPU 22 then returns to step S50 without doing anything.

On the other hand, if the result of the determination at step S51 is affirmative (S51: YES), it means that, for the copy pair, the amount of data write from the primary host system 4 and the amount of data transferred to the second storage controller 3 are out of balance.

Then, the CPU 22 first calculates the amount of data transferred to the second storage controller 3 per unit time DT (S51). Specifically, the CPU 22 calculates the amount of data transfer to the second storage controller 3 per unit time for the copy pair on the basis of the past log information about the copy pair (S52).

The CPU 22 then determines whether or not the calculated data transfer amount DT exceeds a third threshold SH3 configured as a maximum allowable value by a user or an administrator (S53). If the result of the determination is negative (S53: NO), the CPU 22 returns to step S50.

On the other hand, if the result of the determination at step S53 is affirmative (S53: YES), then the CPU 22 initiates an I/O delaying process for delaying a response to an I/O request from the primary host system 4. Specifically, when the CPU 22 receives a data write request or a data read request from the primary host system 4, the CPU 22 returns to the primary host system 4 a response to the I/O after a predetermined amount of delay that does not cause timeout at the primary host system 4, even if the CPU 22 can immediately return the response.

The storage system 1 according to this embodiment is designed in such a manner that the timeout period on the primary host system 4 can be configured by a user or an administrator at his/her discretion by using a management terminal 8 (FIG. 1) or the primary host system 4. Therefore, a common or a different timeout period can be configured for each primary host system 4 and the first storage controller 2 can be notified of the configuration timeout period in the storage system 1. Therefore, at step S53, the CPU 22 returns a response to an I/O request from the primary host system 4 after a delay with taking into consideration the timeout period to the primary host system 4.

Then, the CPU 22 repeats the same process (S50-S54) while changing the copy pair to deal with, thereby reducing the amount of data write from the primary host system 4 for copy pairs, one after another, for which the amount of data write from the primary host 4 has increased.

Figure 14:
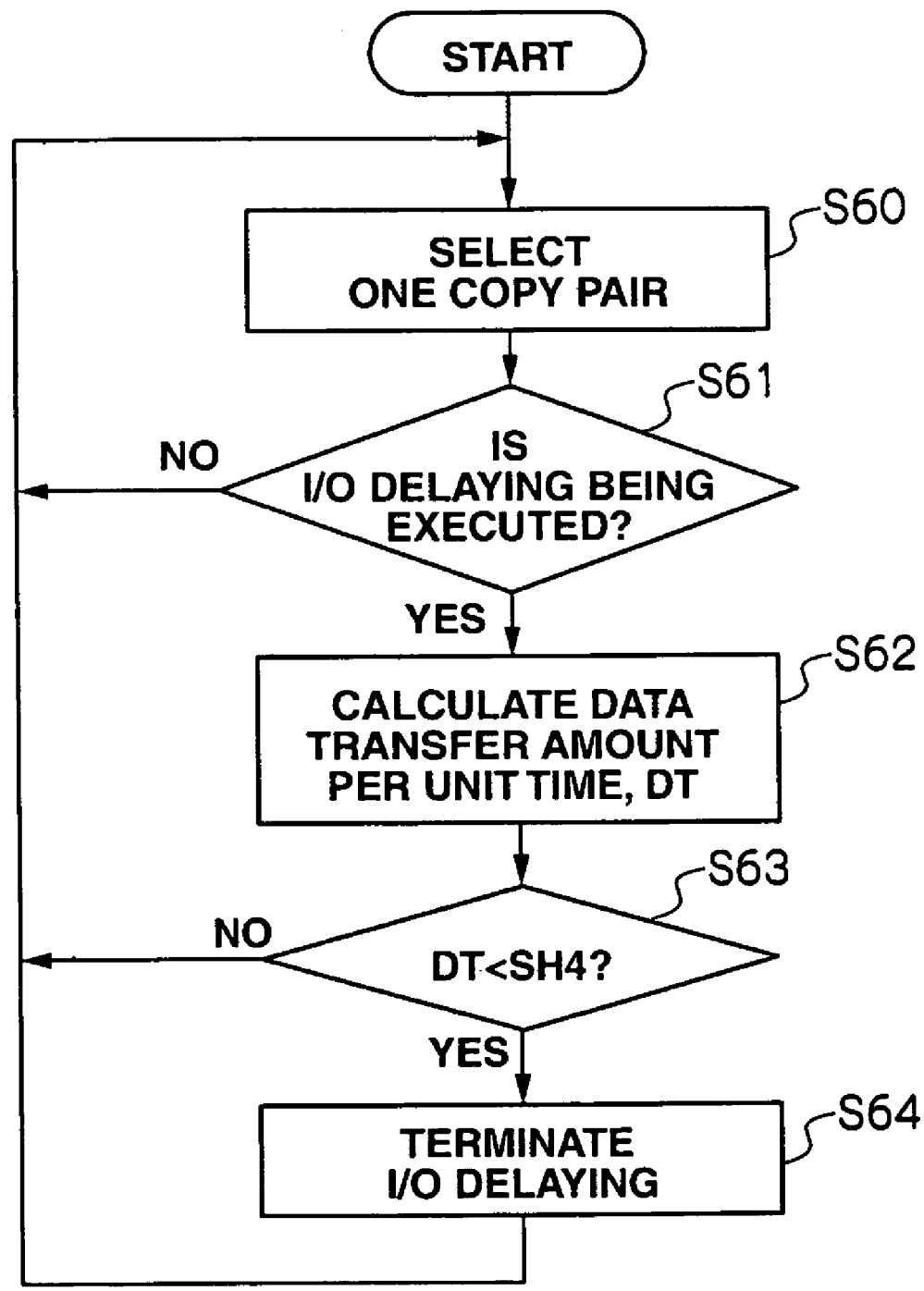
FIG. 14 is a flowchart of an I/O delay termination process.

On the other hand, the CPU 22 performs an I/O delay termination process RT4 shown in FIG. 14 concurrently with the I/O delaying process RT3, to terminate the I/O delaying process for a copy pair for which the reduction of the amount of data write from the primary host system 4 is no longer needed.

In particular, the CPU 22 first selects a copy pair (S60) and determines whether or not an I/O delay process is currently being performed for that copy pair (S61).

If the result of the determination is negative, the CPU 22 returns to step S60. On the other hand, if the result of the determination is affirmative (S61), the CPU 22 calculates the amount of data transferred to the second storage controller 3 per unit time for that copy pair (S62).

Then the CPU 22 determines whether the calculated amount of data transferred DT exceeds a fourth threshold SH4 specified by a user or an administrator that, when exceeded, the CPU 22 should terminate the I/O delaying process (S63). If the result of the determination is negative (S63: NO), the CPU 22 returns to step S50.

On the other hand, if the result of the determination at step S53 is affirmative (S63: YES), the CPU 22 terminates the I/O delaying process initiated for delaying a response to an I/O request from the primary host system 4 for the copy pair (S64).

Then, the CPU 22 changes the copy pairs to deal with and repeats the same process (S60 to S64) to terminate the I/O delaying process for copy pairs for which the I/O delaying process is no longer needed.

In this way, when the amount of data write from the primary host system to the first storage controller increases in the storage system 1, responses to I/O be provided from the first storage controller to the primary host system in response to requests from the primary host system to the first storage controller can be delayed, thereby avoiding the time intervals required for data in a virtual VOL of the first storage controller to be fully formed in a secondary VOL in the second storage controller from temporarily becoming longer. Thus, an increase in the amount of data lost in the event of a failure can effectively be prevented.

(2-4) Cycle Time Adjusting Functions

The functions described above can be performed without adjusting the cycle time during which a snapshot is created in the first storage controller 2 (which is equivalent to the data transfer period between the first and second storage controllers 2, 3). The storage system 1 also has internal cycle time adjusting functions that can statically or dynamically adjust the cycle time, whereby the amount of data lost in the event of a failure can be reduced.

Specifically, a first static cycle time adjusting function used in the storage system 1 can change the cycle time, which is normally 15 seconds, for a user-desired copy pair to a desired amount of time.

Figure 15:
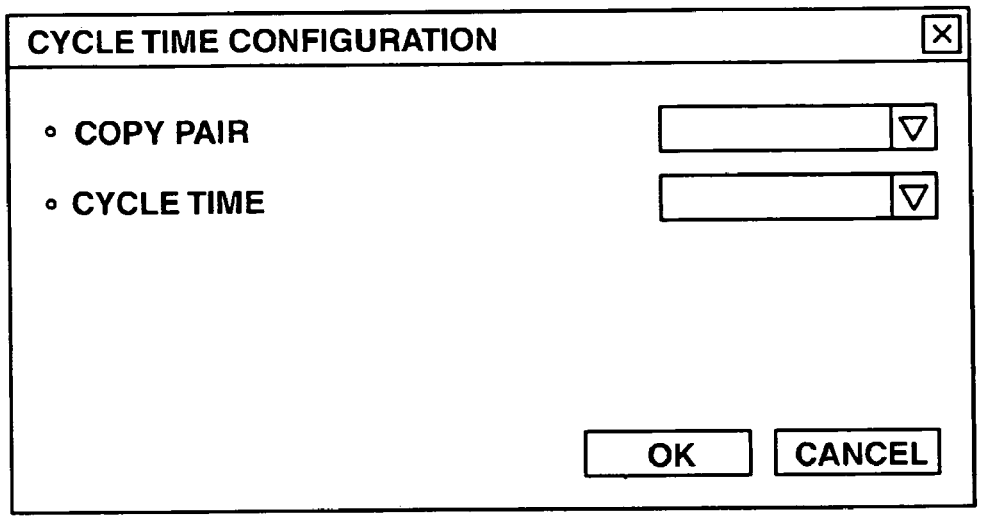
FIG. 15 is a simplified diagram showing a cycle time configuration window.

In practice, a user can operate the primary host system 4 to display a predetermined window 120 as shown in FIG. 15, for example, on the display of the primary host system 4 (hereinafter referred to as the cycle time configuration window) and can configure a desired cycle time for a desired copy pair through the cycle time configuration window 120. The first storage controller 2 is notified of the cycle time configuration through the use of the cycle time configuration window 120 as configuration information. In the following description, the notification is referred to as a cycle time configuration notification.

When receiving a cycle time configuration notification from the primary host system 4, the CPU 22 of the first storage controller 2 changes the cycle time for a specified copy pair to the cycle time specified by the user, on the basis of the cycle time configuration notification. Subsequently, when difference data for the copy pair is transferred from the first storage controller 2 to the second storage controller 3, the CPU 22 will create snapshots sequentially at the changed cycle times for the copy pair and send the difference data sequentially to the second storage controller 3 at the cycle times.

A second static cycle time adjusting function used in the storage system 1 allows a user to register an attribute of data handled by a copy pair, whereby the cycle time for the copy pair is changed to a cycle time according to the registered data attribute.

Figure 16:
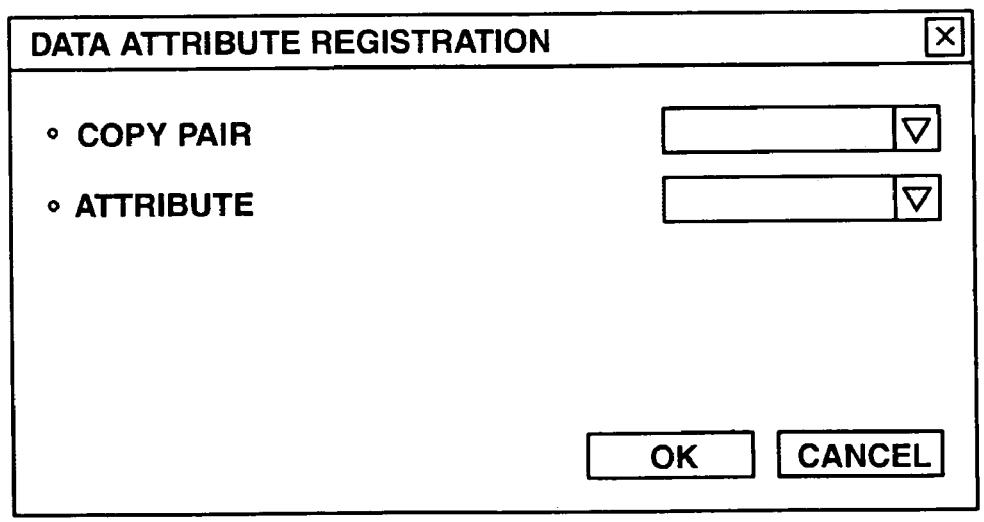
FIG. 16 is a simplified diagram showing a data attribute registration window.

In practice, a user can operate the primary host system 4 to display a predetermined window 121 as shown in FIG. 16 (hereinafter referred to as a data attribute registration window), for example, on the display of the primary host system 4 and can use this data attribute registration window 121 to register an attribute (such as "mail", "database", or "archive") of data handled by a copy pair. The first storage controller 2 is notified of the data attribute registered through this data attribute registration window 121. The notification is hereinafter referred to as a registered data attribute notification.

The CPU 22 of the first storage controller 2 holds in the local memory 25 (FIG. 1) a translation table in which cycle times for data attributes are defined. The CPU 22 changes the cycle time for a specified copy pair to a cycle time according to the data attribute handled by the copy pair on the basis of a registered data attribute notification provided from the primary host system 4.

Subsequently, when difference data for the copy pair is transferred to the second storage controller 3, the CPU 22 creates snapshots sequentially at the changed cycle times for the copy pair and sends the difference data sequentially to the second controller 3 at the cycle times.

On the other hand, a first dynamic cycle time adjusting function used in the storage system 1 allows a user to update the cycle for a desired copy pair at any time. The function makes it possible for a normal 15 second cycle to be discontinued by a user, and the next cycle forcefully started. The user can initiate the function by operating the primary host system 4 to issue an existing command for changing the pair status of a desired copy pair in the first storage controller 2 to "SPLIT" to the first storage controller 2.

On reception of the command, the CPU 22 of the first storage controller 2 creates a snapshot of a primary VOL 70 in the copy pair specified in the command and sends difference data of the snapshot to the second storage controller 3 in a normal manner.

A second dynamic cycle time adjusting function used in the storage system 1 can dynamically change the cycle time for a copy pair according to the amount of difference data transferred of the copy pair (hereinafter referred to as the first cycle time management function).

In practice, the CPU 22 of the first storage controller 2 monitors the amount of difference data transferred of a copy pair for which the first cycle time management function is configured, for example at step S31 of the difference data transfer control process RT 2 described above with respect to FIG. 8.

When the amount of data transferred by any copy pair exceeds a pre-configured fifth threshold SH5, the CPU 22 increases the amount of cycle time for the copy pair; when the amount of data transferred decreases below a preset sixth threshold SH6 (where SH5>SH6), then the CPU 22 reduces the cycle time for the copy pair.

A third dynamic cycle time adjusting function used in the storage system 1 dynamically changes the cycle time for a desired copy pair according to the time difference between the time of creation of a snapshot of the primary VOL 70 and the time of full-formation of the data in a secondary VOL 80 that reflects the snapshot (this function is hereinafter referred to as the second cycle time management function).

In practice, the CPU 22 of the first storage controller 2 constantly monitors the time difference between the time of creation of a snapshot of the primary VOL 70 of a copy pair for which the second cycle time management function is configured and the time of full-formation of the data in the secondary VOL 80 that reflects the snapshot.

When the time difference exceeds a predetermined seventh threshold SH7, the CPU 22 increases the cycle time for the copy pair. On the other hand, when the time difference is smaller than a predetermined eighth threshold SH8, the CPU 22 decreases the cycle time for the copy pair.

Figure 17:
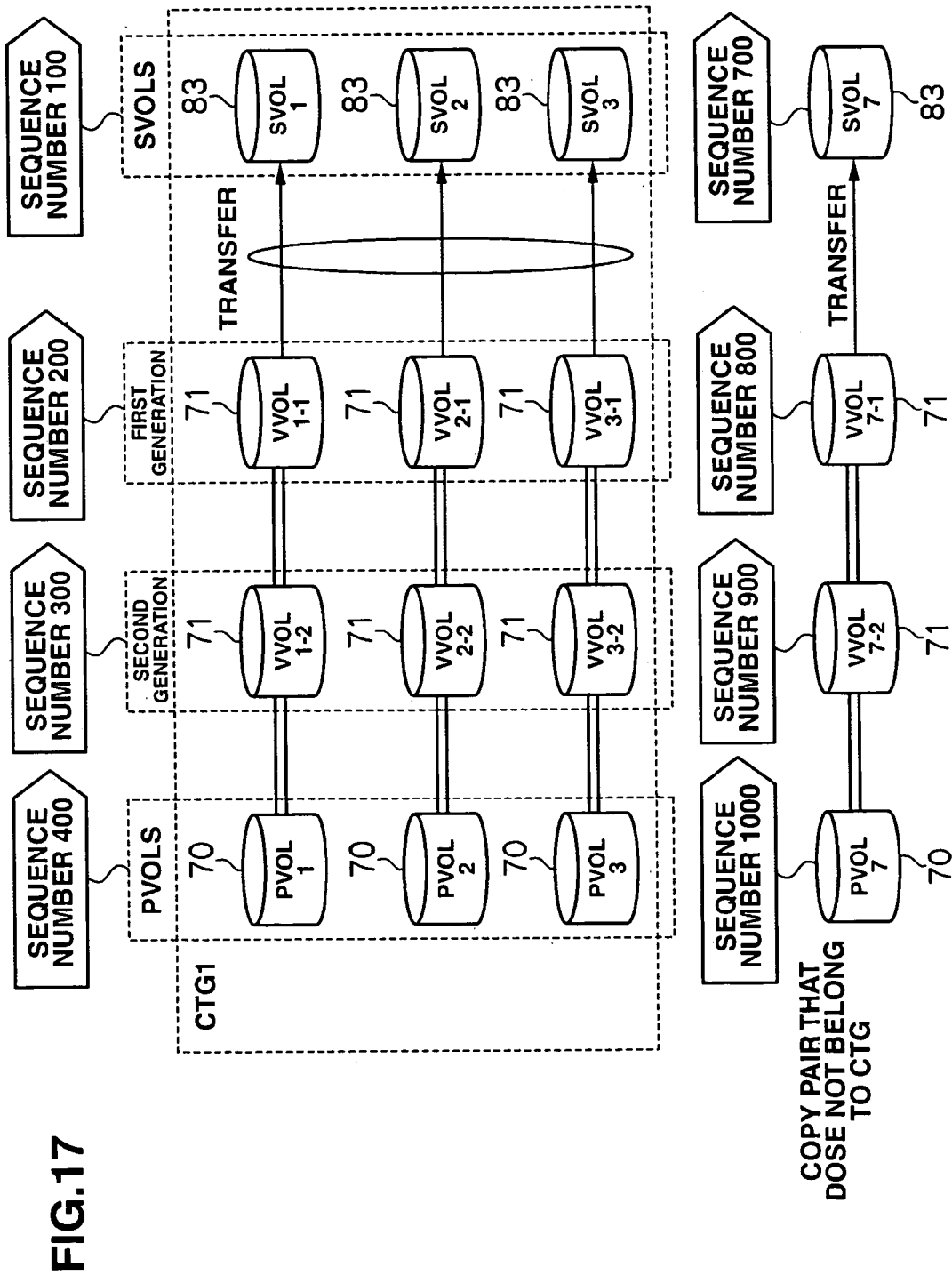
FIG. 17 is a conceptual diagrams used for illustrating sequence numbers.

For this purpose, each time the CPU 22 creates a snapshot of the primary VOL 70 of a copy pair, the CPU 22 stores the time at which it has created the snapshot in the local memory 25, assigns a sequence number to the snapshot as shown in FIG. 17, and manages the sequence number.

On the completion of transfer of difference data of the snapshot associated with the sequence number to the second storage controller 3, the CPU 22 considers that the remote copy of the snapshot has been completed and associates that time with the snapshot creation time as the time at which the data in the secondary VOL 80 has been fully formed and stores them in a predetermined table (hereinafter referred to as the time difference management table) 122 as shown in FIG. 18. The CPU 22 subsequently will calculate the time difference between the time of creation of a snapshot and the time of full-formation of the data in the secondary VOL 80, on the basis of the time difference management table 122.

Figure 19:
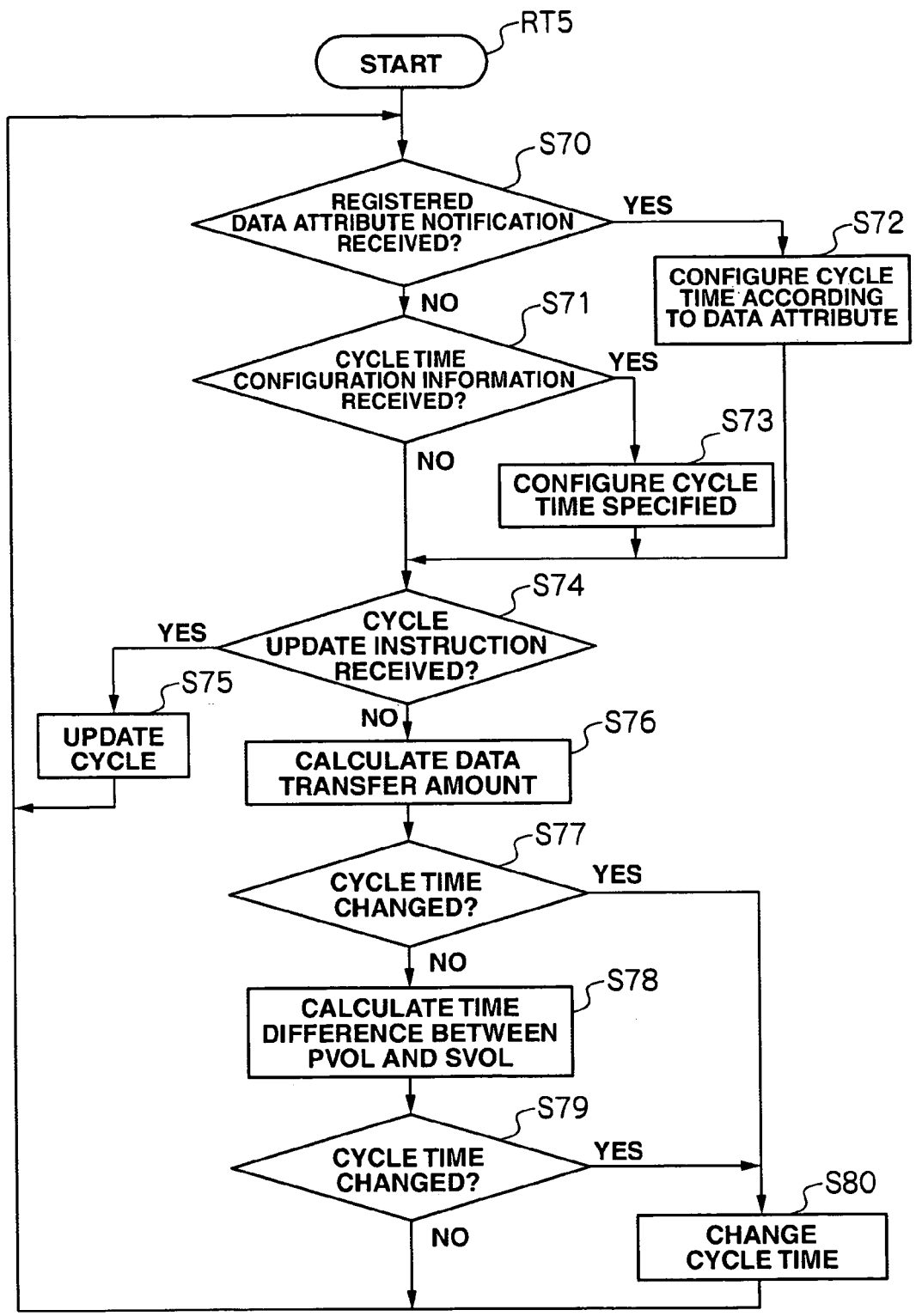
FIG. 19 is a flowchart of a first cycle-time-adjustment process.

FIG. 19 is a flowchart of a process relating to the cycle time adjustment function performed by the CPU 22. The CPU 22 performs the cycle time adjustment process by following the first cycle time adjustment process RT5 shown in FIG. 19 in accordance with a remote copy execution program stored in the local memory 25.

The CPU 22 starts the first cycle time adjustment process RT5 upon power-on of the first storage controller 2. The CPU 22 first determines whether or not it has received a data attribute registration notification or a cycle time configuration notification (S70, S71) and determines whether it has received an affirmation (S70, S71).

If it has received a data attribute registration notification (S70: YES), then the CPU 22 changes the cycle time for the specified copy pair to a cycle time according to the data attribute to be handled by the copy pair, on the basis of the data attribute registration notification (S72).

If it has received a cycle time configuration notification (S71: YES), then the CPU 22 changes the configuration of the cycle time for the specified copy pair to the cycle time specified by the user, on the basis of the cycle time configuration notification (S73).

The CPU 22 then starts operation of the first storage controller 2. After the start of operation, the CPU 22 determines whether it has received a cycle update instruction from the primary host system 4 (S74). If the result of the determination is affirmative (S74: YES), the CPU 22 performs a cycle update so as to terminate the current cycle and start the next cycle (S75), then returns to step S70.

On the other hand, if the result of the determination at step S74 is negative (S74: NO), the CPU 22 calculates the latest amount of data transferred per unit time for each of copy pairs for which the first cycle time management function described above is configured, on the basis of log information about the copy pairs (S76).

The CPU 22 determines on the basis of the result of the calculation at step S76 whether there is a copy pair among the copy pairs for which the cycle time should be updated, that is, whether there is a copy pair whose data transfer amount per unit time calculated at step S76 has increased to a value greater than the fifth threshold SH5 or decreased to a value less than the sixth threshold SH6 (S77).

If the result of the determination is affirmative (S77: YES), the CPU 22 changes the configuration of the cycle time for the copy pair to a value greater than or less than the cycle time currently configuration (S80).

On the other hand, if the result of the determination at step S77 is negative (S77: NO), the CPU 22 calculates, for each of the copy pairs for which the second cycle time management function is configured, the time difference between the time of creation of a snapshot of the primary VOL 70 and the time of full-formation of the data in the secondary VOL 80 that reflects the snapshot, on the basis of the time information described with respect to FIG. 18 (S78).

Then, the CPU 22 determines from the result of calculation at step S78 whether there is a copy pair among the copy pairs for which the cycle time should be changed, that is, whether there is a copy pair in which the time difference calculated at S78 is greater than the seventh threshold SH7 or less than the eighth threshold SH8 (S79).

If the result of the determination is affirmative (S79: YES), then the CPU 22 changes the configuration of the cycle time for the copy pair to increase or reduce the cycle time currently configured (S80). On the other hand, if the result of the determination at step S79 is negative (S79: NO), the CPU 22 returns to step S70 and repeats the same process (S70-S80).

(2-5) Function of Adjusting Cycle Time Based on Statistic Information

The first storage controller 2 includes a cycle time adjusting function that monitors daily variations in the data transfer amount for a specified copy pair, schedules, on the basis of statistic information obtained through the observation, the cycle time for the copy pair on hour by hour, and changes the cycle time for the copy pair daily according to the schedule as needed.

Figure 20:
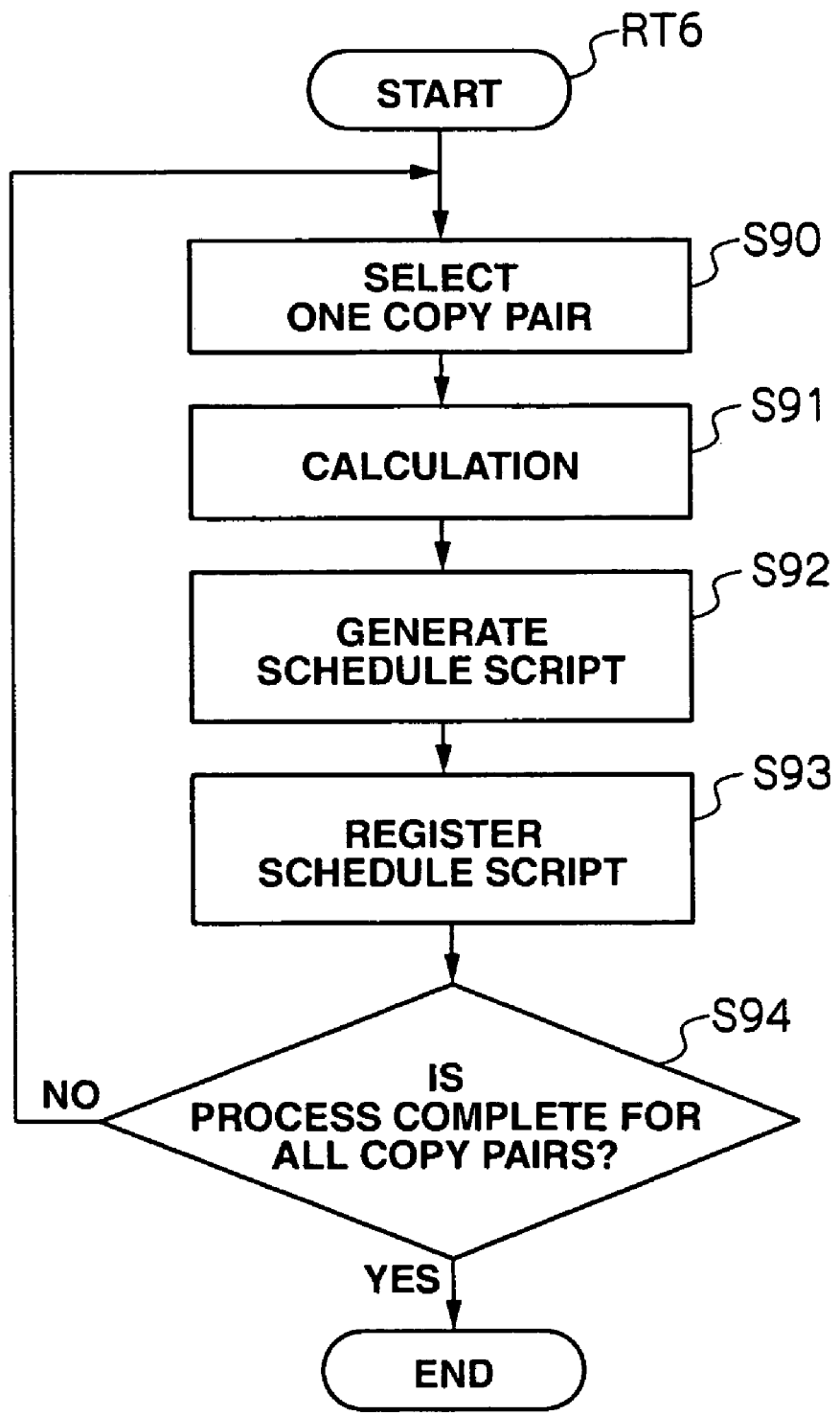
FIG. 20 is a flowchart of a second cycle-time-adjustment process.

FIG. 20 is a flowchart of a process relating to the statistic-information-based cycle time adjustment function performed by the CPU 22 of the first storage controller 2. The CPU 22 adjusts the cycle time for each copy pair hour by hour in the day by following the second cycle time adjustment process RT6 shown in FIG. 20 in accordance with a remote copy execution program 61 (FIG. 2) stored in the local memory 25.

The CPU 22 initiates the second cycle time adjustment process RT6 daily (at intervals of 24 hours), selects one copy pair (S90), and calculates the data transfer amount in the copy pair every hour (hereinafter referred to as a timeslot) from 0 o'clock to 23 o'clock as shown on the basis of data transfer log data about the copy pair (S91). Then, the CPU 22 creates a table 130 as shown in FIG. 21 for example (hereinafter referred to as the calculated data transfer amount table) from the result of the calculation.

The CPU 22 then prioritizes copy pairs on the basis of the calculated data transfer amount table 130 so that the difference data transfer command jobs in each copy pair in a time slot during which the amount of data transferred is statistically large is decreased. The CPU 22 then generates a schedule script 131 that specifies the priority of the copy pair in each time slot as shown in FIG. 22, for example (S92). In the example shown in FIG. 22, the number of difference data transfer command jobs that can be generated by a command job generating unit 110 (FIG. 9) per unit time for the copy pair in each time slot is defined as the priority in the time slot.

Then, the CPU 22 stores the schedule script 131 in the local memory 25 (S93). Subsequently, the CPU 22 determines whether or not the same process has been done for all copy pairs and consistency groups for which the statistic-information-based cycle time adjustment function is configured (S94).

If the result of the determination is negative (S94: NO), the CPU 22 returns to step S90 and repeats the same process (S90-S94) until it obtains the affirmative result at step S94 while changing the copy pair to address.

When the CPU 22 eventually obtains the affirmative result of the determination at step S94 (S94: YES), the process will end.

The CPU 22 will subsequently check each of such schedule scripts 131 every one hour to update the command job priority information 112 (FIG. 9) on the basis of the schedule script 131 if needed, so that the number of difference data transfer command jobs per unit time for the copy pair associated with the schedule script 131 becomes less than or equal to the number of jobs specified in the schedule script 131 for the present time slot.

Thus, the amount of data transferred in each copy pair is adjusted daily basis in such a manner that, for example, that the cycle time during night time hours in which smaller amount of data is transferred is changed accordingly.

(3) Effects of the Present Embodiment

In the storage system 1 with the arrangements described above, multiple pool VOLs 72 can be configured in the first storage controller 2 and, each time a copy pair is created, a different pool VOL 72 or an already created pool VOL 72 is assigned to the copy pair in a duplex manner.

Therefore, in the storage system 1, when the amount of data write to a particular consistency group 90 or a particular primary VOL 70 that does not belong to any consistency group increases, the storage space for storing difference data of snapshots created for other copy pairs is not exhausted. Thus, the configuration of the first storage controller 2 as described above can prevent an increase in the amount of data write to a consistency group 90 or a primary VOL 70 that does not belong to any consistency group from affecting the other copy pairs. Therefore, a reliable storage system can be provided.

(4) OTHER EMBODIMENTS

While the embodiment has been described in which a pool VOL 72 is allocated to each consistency group or each primary VOL that does not belong to any consistency group, the present invention is not so limited. A pool VOL 72 may also be allocated to each primary VOL 70 in a consistency group as well as each primary VOL 70 that does not belong to any consistency group. This configuration also can provide effects similar to those described above.

While the multiple virtual VOL creation function in the present embodiment has been described in which no limit is imposed on the number of virtual VOLs 71 that can be created in the first storage controller 2, the present invention is not so limited. The number of virtual VOLs 71 that can be created in the first storage controller 2 may be limited to a certain number (for example up to five). This can prevent an increase in the amount of management information about the virtual VOL 71.

While the multiple virtual VOL creation function in the present embodiment has been described in which the number of virtual VOLs 71 can be increased as required, the present invention is not so limited. The number of virtual VOL 71 may be dynamically changed so that virtual VOLs 71 that are no longer required can be deleted.

While the embodiment has been described in which the cycle time during which a snapshot is created in the first storage controller 2 is varied in accordance with the amount of difference data transferred from the first storage controller 2 to the second storage controller 3, the present invention is not so limited. For example, the cycle time for a copy pair may be varied in accordance with the amount of data written from the primary host system 4 to the first storage controller 2 per unit time, the amount of difference data stored in an associated pool VOL 72, or the remaining storage space of an associated pool VOL 72.

While the statistic-information-based cycle time adjustment function in the present embodiment has been described in which the cycle time is varied daily by the hour as required, on the basis of statistic information about the amount of data transferred from the first storage controller 2 to the second storage controller 3, the present invention is not so limited. The cycle time may be varied at other regular intervals (for example weekly, monthly, or annually) and by other time unit (for example by the second, the minute, hours, the day, the week, or the month), as required.

While the embodiments have been described in which processes such as the difference data transfer control process, I/O delaying process, and cycle time adjustment process are independently performed in the first storage controller 2, the present invention is not so limited. For example, the first storage controller 2 may be designed so that these processes are performed in an alternative way according to the number of virtual VOLs 72 created in the first storage controller 2. In particular, if there are 4 or less virtual VOLs 72 in a first storage controller 2 in which the number of virtual VOLs 72 that can be created is limited up to 5, the CPU 22 of the first storage controller 2 may perform the I/O delaying process; if there are 5 virtual VOLs 72, it may perform the difference data transfer control process.

While one static cycle time adjustment function has been described in the above embodiment in which a cycle time configuration window 120 is used to change the cycle time for a desired copy pair to a desired fixed amount, the present invention is not so limited. A user may be allowed to flexibly configure different cycle times for different time slots. With this, it is possible to configure a longer or shorter cycle time for the night hours in order to make backup copies at night, for example. Thus, the manageability of the system can be improved.

The cycle time adjustment process has been described in the embodiment in which the cycle time adjustment is performed on the basis of a cycle time configuration by a user, a data attribute registered by a user, a cycle update triggered by a user operation, the amount of difference data transferred in a copy pair, or the time difference between the time of creation of a snapshot and the time of full-formation of the data in the secondary VOL 80. However, the present invention is not so limited. The first storage controller 2 may be configured so that the cycle time adjustment process is performed at other timing or in response to other conditions.

For example, if a production volume is switched from a primary VOL 70 to a secondary VOL 80 in the event of a failure in the first storage controller 2, all data in the primary VOL 70 must be transferred to the secondary VOL 80 before the switching. Therefore, the first storage controller 2 may be configured in such a manner that a cycle update is performed in preference to other processes in order that data transfer from the first storage controller 2 to the second storage controller 3 can be performed quickly.

The present invention relates to a storage controller and a control method thereof, and can be widely applied to storage controllers that include the capability of holding data written from a host system and duplexing the data into another storage controller.

What is claimed is:

1. A first storage controller which holds write data provided from a host system and duplexes said data in a second storage controller, comprising:
   a storage device which provides a storage area for storing data; and
   a controller,
   wherein said controller:
      configures a production volume and a pool volume on said storage area,
      sequentially stores said data provided from said host system into said production volume,
      sequentially creates a snapshot composed of a data image of said production volume at a given point in time at regular or irregular intervals, and
      when said data is written in said production volume after said snapshot is created, sequentially saves the original data that is contained in said production volume immediately prior to the write of said data into said pool volume as difference data as appropriate, and after creating a new version of said snapshot, sequentially reads said difference data of said previously created snapshot from said pool volume and transfers said difference data to said second storage controller, and wherein said controller further:
configures a plurality of said pool volumes,
assigns a first pool volume out of a plurality of said pool volumes to a first copy pair,
assigns a second pool volume to both of a second and third copy pairs,
wherein each of said copy pairs includes a group of related production volumes and its corresponding secondary volume contained in the second storage controller, or includes one of said production volumes that does not belong to the group of related production volumes and its corresponding secondary volume contained in the second storage controller,
creates said snapshot for each of said copy pairs regularly and changes cycle time as appropriate, said cycle time being a time interval during which said snapshot is created,
obtains, for each of said copy pairs, a time difference between the time of creation of said snapshot and the time of completion of transfer of said snapshot to said second storage controller, and
dynamically changes said cycle time for each of said copy pairs in accordance with said time difference,
wherein when the time difference is greater than a predetermined first threshold value, the controller increases said cycle time for each of said copy pairs, and
wherein when the time difference is less than a predetermined second threshold value, the controller decreases said cycle time for each of said copy pairs.

2. A method for controlling a first storage controller which holds write data provided from a host system and duplexes said data in a second storage controller, comprising:
a first step of configuring a production volume and a pool volume on a storage
area provided by a storage device; and
a second step of sequentially:
storing said data provided from said host system into said production volume,
creating a snapshot composed of an data image of said production volume at a given point in time at regular or irregular intervals, and
when said data is written in said production volume after said snapshot is created, saving the original data that is contained in said production volume immediately prior to the write of said data into said pool volume as difference data as appropriate, and
after creating a new version of said snapshot, reading said difference data of said previously created snapshot from said pool volume and transferring said difference data to said second storage controller;
wherein said first step further comprises:
configuring a plurality of said pool volumes, and
assigning each of said pool volumes to a respective one of a plurality of copy pairs,
wherein each of said copy pairs includes a group of related production volumes and its corresponding secondary volume contained in the second storage controller, or includes one of said production volumes that does not belong to the group of related production volumes and its corresponding secondary volume contained in the second storage controller; and wherein said second step further comprises:
saving said difference data of said copy pair into one of said pool volumes that is associated with said copy pair,
creating said snapshot for each of said copy pairs regularly and changes cycle time as appropriate, said cycle time being a time interval during which said snapshot is created,
obtaining, for each of said copy pairs, a time difference between the time of creation of said snapshot and the time of completion of transfer of said snapshot to said second storage controller,
dynamically changing said cycle time for each of said copy pairs in accordance with said time difference,
when the time difference is greater than a predetermined first threshold value, increasing said cycle time for each of said copy pairs, and
when the time difference is less than a predetermined second threshold value, decreasing said cycle time for each of said copy pairs.

3. The method for controlling a first storage controller according to claim 2, wherein said second step further comprises:
performing the data transfer process for transferring said difference data to said second storage controller in precedence to other processes.

4. The method for controlling a first storage controller according to claim 2, wherein said second step further comprises:
monitoring the amount of data transfer of said difference data of each of said copy pair to said second storage controller; and
dynamically changing the priority of the data transfer process for transferring said difference data of each of said copy pairs to said second storage controller according to the amount of the data transfer.

5. The method for controlling a first storage controller according to claim 2, wherein said first step further comprises:
creating a plurality of virtual volumes, each of which holds said snapshot for each of said copy pairs as appropriate.

6. The method for controlling a first storage controller according to claim 2, wherein said second step further comprises:
monitoring the amount of data transfer of said difference data of each of said copy pairs to said second storage controller; and
dynamically changing, for each of said copy pairs, the response time to an input/output request provided from said host system to said production volume, in accordance with the amount of data transfer.

7. The method for controlling a first storage controller according to claim 2, wherein said second step further comprises:
changing said cycle time for said copy pair to any of a cycle time specified by a user for said copy pair, provided from said host system and a cycle time according to an attribute of data registered by a user as data handled by said copy pair.

8. The method for controlling a first storage controller according to claim 2, wherein said second step further comprises:
monitoring the amount of data transfer of said difference data of each of said copy pairs to said second storage controller; and dynamically changing, for each of said copy pairs, the cycle time in accordance with the amount of data transfer.

9. The method for controlling a first storage controller according to claim 2, wherein said second step further comprises:
obtaining statistic information about the amount of data transfer of said difference data of each of said copy pairs to said second storage controller; and
dynamically changing said cycle time for each of said copy pairs on the basis of said statistic information.

10. A first storage controller which holds write data provided from a host system and duplexes said data in a second storage controller, comprising:
a storage device which provides a storage area for storing data; and
a controller,
wherein said controller:
configures a production volume and a pool volume on said storage area,
sequentially stores said data provided from said host system into said production volume,
sequentially creates a snapshot composed of a data image of said production volume at a given point in time at regular or irregular intervals, and
when said data is written in said production volume after said snapshot is created, sequentially saves the original data that is contained in said production volume immediately prior to the write of said data into said pool volume as difference data as appropriate, and
after creating a new version of said snapshot, sequentially reads said difference data of said previously created snapshot from said pool volume and transfers said difference data to said second storage controller, and
wherein said controller further:
configures a plurality of said pool volumes,
assigns each of said pool volumes to a respective one of a plurality of copy pairs,
wherein each of said copy pairs includes a group of related production volumes and its corresponding secondary volume contained in the second storage controller, or includes one of said production volumes that does not belong to the group of related production volumes and its corresponding secondary volume contained in the second storage controller,
saves said difference data of said copy pair into one of said pool volumes that is associated with said copy pair,
creates said snapshot for each of said copy pairs regularly and changes cycle time as appropriate, said cycle time being a time interval during which said snapshot is created,
obtains, for each of said copy pairs, a time difference between the time of creation of said snapshot and the time of completion of transfer of said snapshot to said second storage controller, and
dynamically changes said cycle time for each of said copy pairs in accordance with said time difference,
wherein when the time difference is greater than a predetermined first threshold value, the controller increases said cycle time for each of said copy pairs, and
wherein when the time difference is less than a predetermined second threshold value, the controller decreases said cycle time for each of said copy pairs.

11. The first storage controller according to claim 10, wherein said controller performs the data transfer process for transferring said difference data to said second storage controller in precedence to other processes.

12. The first storage controller according to claim 10, wherein said controller:
monitors the amount of data transfer of said difference data of each of said copy pairs to said second storage controller; and
dynamically changes the priority of the data transfer process for transferring said difference data of each of said copy pairs to said second storage controller according to the amount of the data transfer.

13. The first storage controller according to claim 10, wherein the controller creates a plurality of virtual volumes, each of which holds said snapshot for each of said copy pairs as appropriate.

14. The first storage controller according to claim 10, wherein said controller:
monitors the amount of data transfer of said difference data of each of said copy pairs to said second storage controller; and
dynamically changes, for each of said copy pairs, the response time to an input/output request provided from said host system to said production volume, in accordance with the amount of data transfer.

15. The first storage controller according to claim 10, wherein said controller changes said cycle time for said copy pair to any of a cycle time specified by a user for said copy pair, provided from said host system and a cycle time according to an attribute of data registered by a user as data handled by said copy pair.

16. The first storage controller according to claim 10, wherein said controller monitors the amount of data transfer of said difference data of each of said copy pairs to said second storage controller; and
dynamically changes, for each of said copy pairs, the cycle time in accordance with the amount of data transfer.

17. The first storage controller according to claim 10, wherein said controller:
obtains statistic information about the amount of data transfer of said difference data of each of said copy pairs to said second storage controller; and
dynamically changes said cycle time for each of said copy pairs based on said statistic information.

* * * * *